(12) United States Patent
Kato et al.

(10) Patent No.: US 10,310,624 B2
(45) Date of Patent: Jun. 4, 2019

(54) ELECTRONIC APPARATUS, METHOD FOR CONTROLLING ELECTRONIC APPARATUS, AND CONTROL PROGRAM FOR THE SAME

(71) Applicant: KONICA MINOLTA, INC., Chiyoda-ku (JP)

(72) Inventors: Takeshi Kato, Chiyoda-ku (JP); Masashi Mizukane, Chiyoda-ku (JP)

(73) Assignee: KONICA MINOLTA, INC., Tokyo (JP)

(*) Notice: Subject to any disclaimer, the term of this patent is extended or adjusted under 35 U.S.C. 154(b) by 15 days.

(21) Appl. No.: 15/535,987

(22) PCT Filed: Nov. 19, 2015

(86) PCT No.: PCT/JP2015/082495
§ 371 (c)(1),
(2) Date: Jun. 14, 2017

(87) PCT Pub. No.: WO2016/098519
PCT Pub. Date: Jun. 23, 2016

(65) Prior Publication Data
US 2018/0292906 A1    Oct. 11, 2018

(30) Foreign Application Priority Data

Dec. 17, 2014 (JP) ................. 2014-255140

(51) Int. Cl.
*G06F 3/01* (2006.01)
*G09G 5/00* (2006.01)
(Continued)

(52) U.S. Cl.
CPC ......... *G06F 3/017* (2013.01); *G02B 27/0172* (2013.01); *G06F 3/01* (2013.01);
(Continued)

(58) Field of Classification Search
None
See application file for complete search history.

(56) References Cited

U.S. PATENT DOCUMENTS

| 2012/0313848 | A1 | 12/2012 | Galor et al. |
| 2013/0271397 | A1 | 10/2013 | MacDougall et al. |

(Continued)

FOREIGN PATENT DOCUMENTS

| JP | 2011-221672 | 11/2011 |
| JP | 2012-163611 | 8/2012 |

(Continued)

OTHER PUBLICATIONS

Search Report dated Jun. 27, 2018 which issued in the corresponding European Patent Application No. 15869727.6.

*Primary Examiner* — Kenneth B Lee, Jr.
(74) *Attorney, Agent, or Firm* — Cozen O'Connor

(57) ABSTRACT

An electronic apparatus includes a proximity sensor to detect an object, a device, and a control circuit to control the device. The control circuit executes a first mode which executes a first control for the device or the control circuit in response to an output of the proximity sensor corresponding to a first movement of the object and a second mode which skips the first control for an output of the proximity sensor corresponding to the first movement. The control circuit switches from the second mode to the first mode or from the first mode to the second mode based on an output of the proximity sensor corresponding to a second movement of the object different from the first movement. The second movement is a movement in which the object stays at a detection region for a first time, and then leaves the detection region within a second time.

14 Claims, 19 Drawing Sheets

(51) Int. Cl.
*H04N 5/74* (2006.01)
*G02B 27/01* (2006.01)

(52) U.S. Cl.
CPC ............... *G09G 5/00* (2013.01); *G09G 5/003* (2013.01); *H04N 5/74* (2013.01); *G02B 2027/014* (2013.01); *G09G 2354/00* (2013.01)

(56) References Cited

U.S. PATENT DOCUMENTS

| | | |
|---|---|---|
| 2014/0282280 A1 | 9/2014 | Pack et al. |
| 2014/0361988 A1* | 12/2014 | Katz ................. G06F 3/011 345/156 |

FOREIGN PATENT DOCUMENTS

| | | |
|---|---|---|
| JP | 2013-534009 | 8/2013 |
| JP | 2014-62426 | 4/2014 |
| JP | 2014-75759 | 4/2014 |
| JP | 2014-531662 | 11/2014 |

* cited by examiner

FIG. 8
(a)
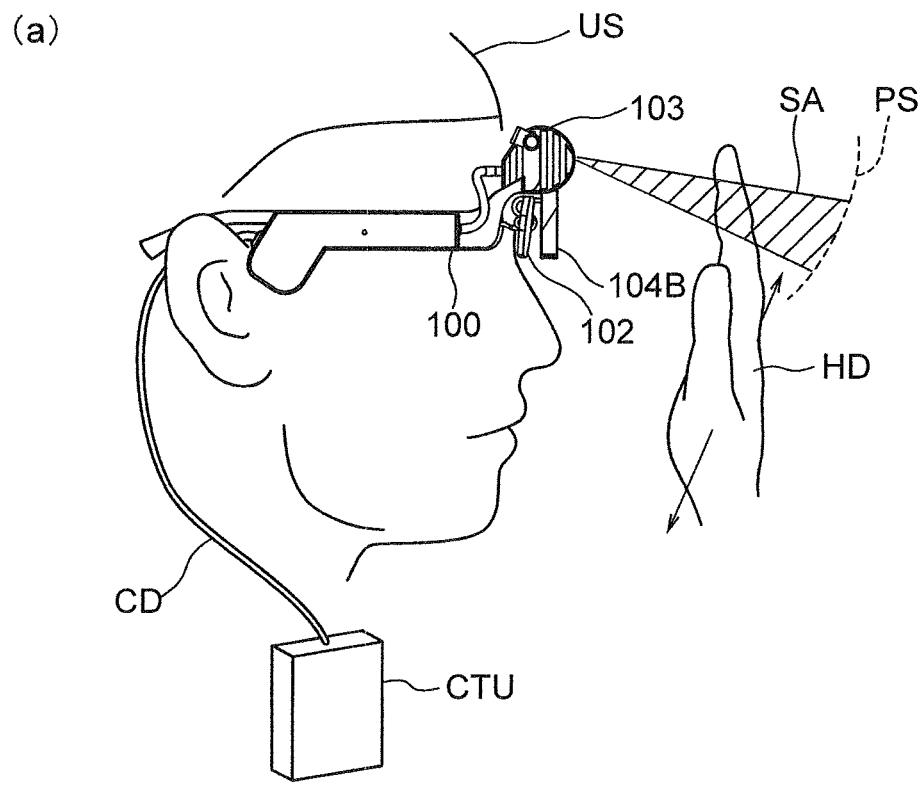
(b)
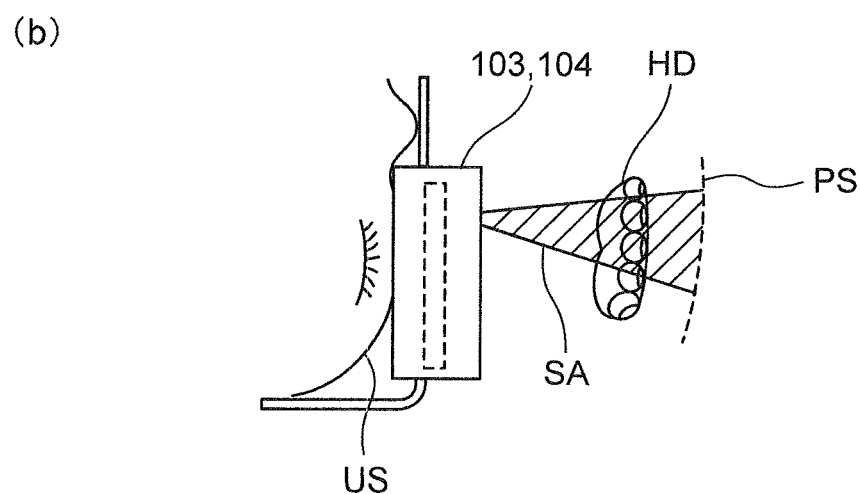

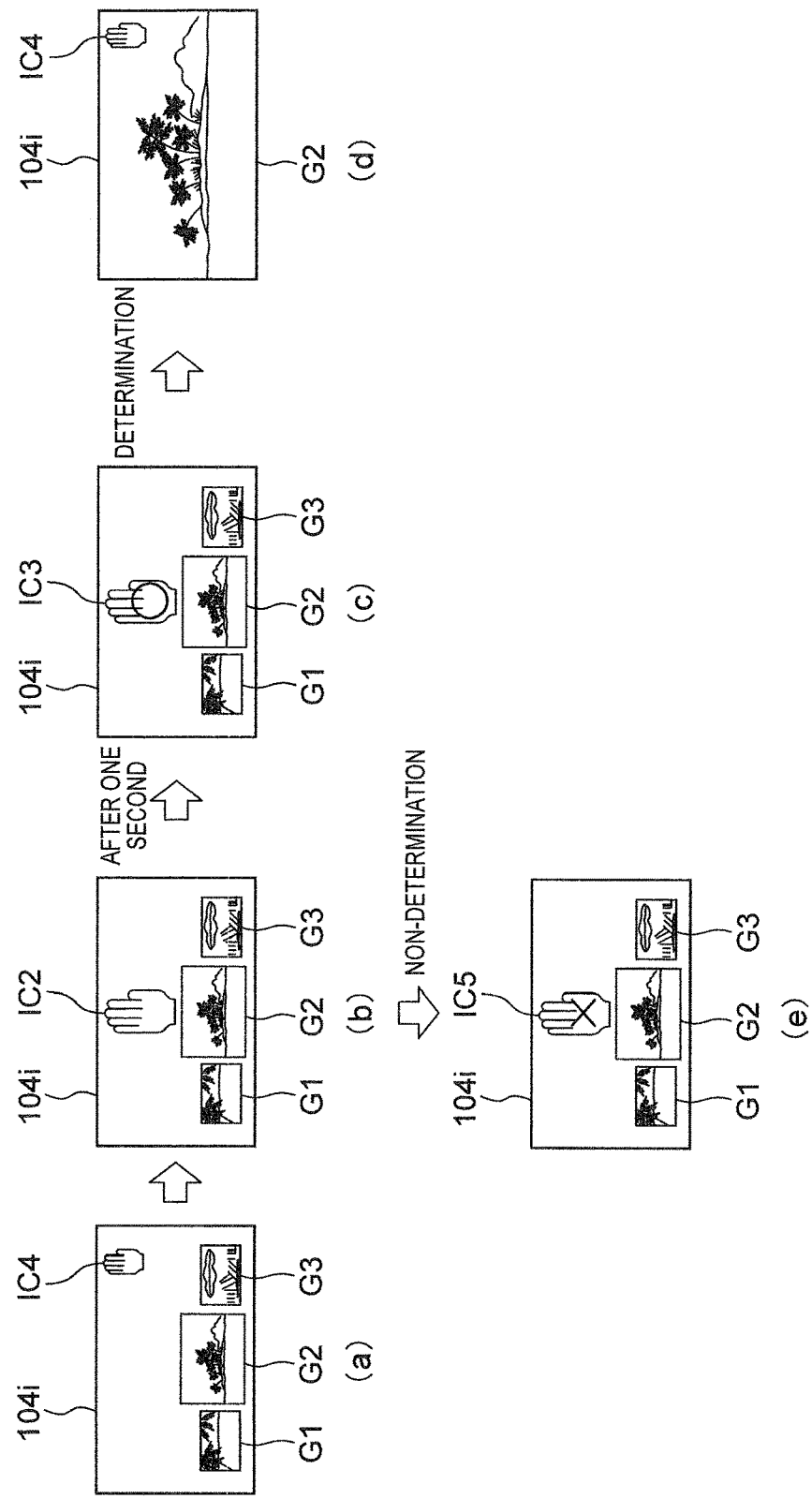

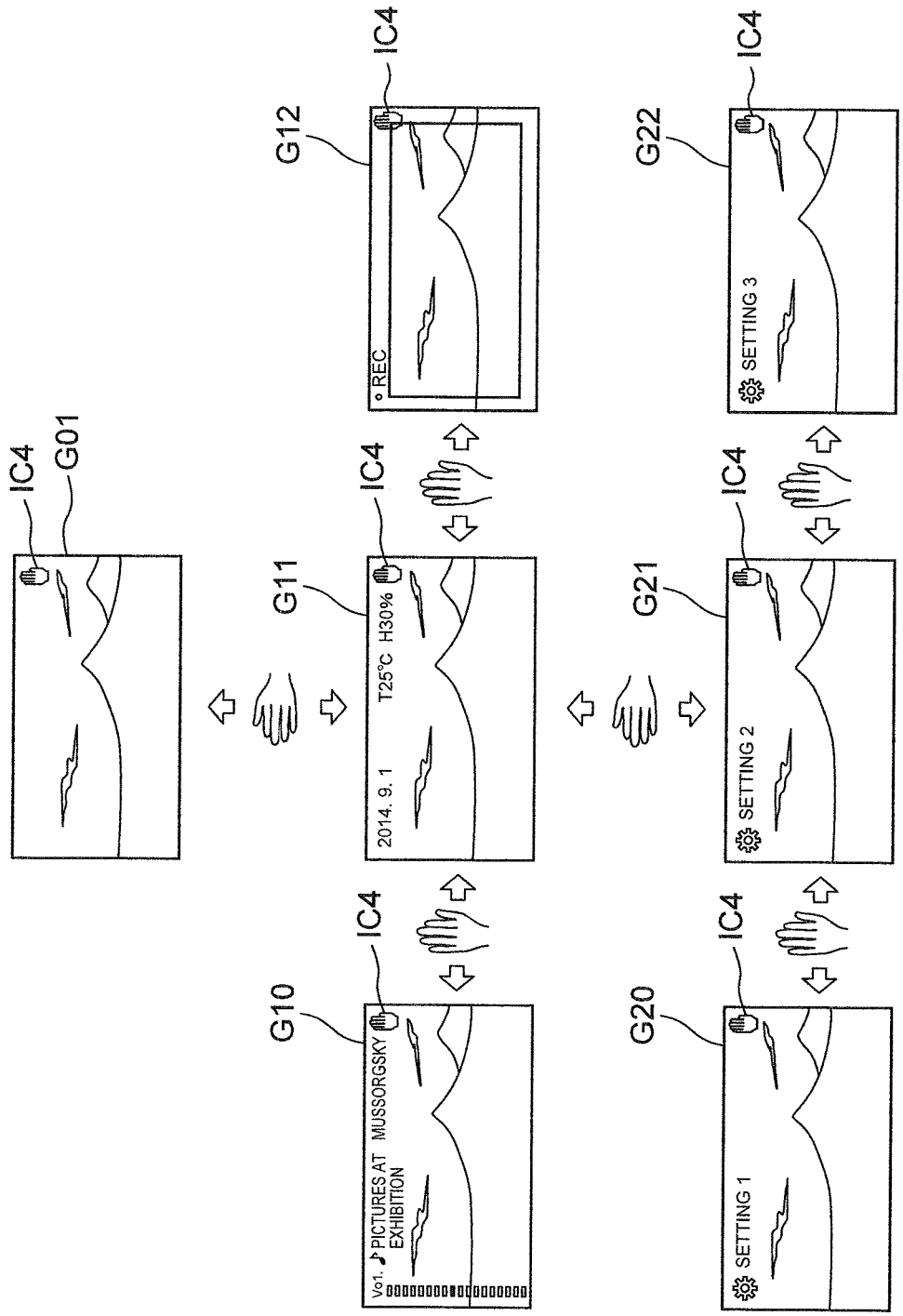

ELECTRONIC APPARATUS, METHOD FOR CONTROLLING ELECTRONIC APPARATUS, AND CONTROL PROGRAM FOR THE SAME

RELATED APPLICATIONS

This is a U.S. National Phase Application under 35 USC 371 of International Application PCT/JP2015/082495 filed on Nov. 19, 2015.

This application claims the priority of Japanese application no. 2014-255140 filed Dec. 17, 2014, the entire content of which is hereby incorporated by reference.

TECHNICAL FIELD

The present invention relates to an electronic apparatus, a method for controlling an electronic apparatus, and a control program for the same.

BACKGROUND ART

In recent years, mobile terminals, such as quickly-developed smart phones, are used for work assistance at business, and homes in many cases. General mobile terminals are provided with a screen of a touch panel type serving as both image display and a user interface. Accordingly, a user can perform necessary input by touching this, and perform operations, such as displaying a desired image, and inputting information. However, in the case where user's hands have got wet or dirty, there may be a case where the user would like to operate a mobile terminal without touching a screen. Accordingly, at this time, how to perform input becomes a problem.

PTL 1 discloses a movable computing device equipped with an infrared LED and an infrared proximity sensor. According to the technique of PTL 1, when a hand is made to approach the movable computing device, infrared light rays emitted from the infrared LED are reflected on the hand, and the reflected light rays are detected by the infrared proximity sensor, whereby the movement of the hand can be detected. Furthermore, with the detected movement (a gesture) of the hand, an input operation desired by the user, such as a swipe, can be performed with a non-contact mode. Therefore, even if the user's hands have got dirty, there is no fear of polluting the movable computing device.

CITATION LIST

Patent Literature

PTL 1: Japanese Translation of PCT International Application Publication No. JP2013-534009A

SUMMARY OF INVENTION

Technical Problem

Incidentally, in the movable computing device disclosed by PTL 1, infrared light rays emitted from the infrared LED may be reflected on an object other than the user's hands, and then may be detected by the infrared detecting sensor. Accordingly, the detection of this object may be erroneously recognized as the movement of a user's hand, which leads to a fear of causing an erroneous operation. In particular, in the case where the movable computing device is placed near an object, or an object moves across in front of the infrared detecting sensor, it may be said that a fear of erroneous detection is high. In contrast, for example, in the case where a user does not perform a gesture operation, a rest mode is set to make a control device ignore output from an infrared proximity sensor so as to attain suppression of erroneous detection, which may be said as one countermeasure. However, if all the gesture operations are invalidated with the setting of such a rest mode, the release of the rest mode also cannot be performed with a non-contact mode. Then, in order to release the rest mode, it is obliged to touch the mobile computing device. Accordingly, not only usability gets worse, but also there is a fear that, if hands have got dirty, the hands may pollute this.

The present invention has been achieved in view of the above-mentioned circumstances, and an object of the present invention is to provide an electronic apparatus that can suppress erroneous detection effectively while realizing operation with a non-contact manner, a method of controlling an electronic apparatus, and a control program for it.

Solution to Problem

In order to realize at least one of the above-mentioned object, an electronic apparatus that reflects one aspect of the present invention, includes:
- a proximity sensor to detect an object on a detection region within a proximity range and to create an output;
- at least one device controlled based on a control signal; and
- a control circuit to create a control signal to control the at least one device,
- wherein the control circuit is able to execute a first mode which executes a first control with respect to the at least one device or the control circuit itself in response to an output of the proximity sensor corresponding to a first movement of the object relative to the proximity sensor and a second mode that skips the first control for an output of the proximity sensor corresponding to the first movement,
- wherein the control circuit switches from the second mode to the first mode or from the first mode to the second mode based on an output of the proximity sensor corresponding to a second movement of the object, different from the first movement, relative to the proximity sensor, and
- wherein the second movement is a movement in which the object stays at the detection region for a first time, and thereafter, leaves the detection region from there within a second time.

In order to realize at least one of the above-mentioned object, a method of controlling an electronic apparatus reflecting one aspect of the present invention is a method of controlling an electronic device that is equipped with a proximity sensor to detect an object on a detection region within a proximity range and to create an output, and at least one device controlled based on a control signal, comprising:
- being able to set by switching a first mode that executes a first control with respect to the at least one device or a control circuit itself in response to an output of the proximity sensor corresponding to a first movement of the object relative to the proximity sensor and a second mode that skips the first control for an output of the proximity sensor corresponding to the first movement; and
- switching from the second mode to the first mode or from the first mode to the second mode base on an output of the proximity sensor corresponding to a second movement of the object, different from the first movement, relative to the proximity sensor, wherein the second movement is a movement in which the object stays at the detection region for a first time, and thereafter, leaves the detection region within a second time from there.

In order to realize at least one of the above-mentioned object, a control program reflecting one aspect of the present invention is a control program for an electronic apparatus equipped with a proximity sensor to detect an object on a detection region within a proximity range and to create an output, at least one device controlled based on a control signal, and a control circuit to create a control signal to control the device based on an output of the proximity sensor, comprising:

controlling based on the control program the control circuit so as to be able to execute a first mode that executes a first control with respect to the at least one device or the control circuit itself in response to an output of the proximity sensor corresponding to a first movement of the object relative to the proximity sensor and a second mode that skips the first control for an output of the proximity sensor corresponding to the first movement; and switching from the second mode to the first mode or from the first mode to the second mode based on an output of the proximity sensor corresponding to a second movement of the object, different from the first movement, relative to the proximity sensor, and wherein the second movement is a movement in which the object stays at the detection region for a first time, and thereafter, leaves the detection region within a second time from there.

Advantageous Effects of Invention

According to the present invention, it is possible to provide an electronic apparatus that can suppress erroneous detection effectively while realizing operation with a non-contact manner, a method of controlling an electronic apparatus, and a control program of it.

BRIEF DESCRIPTION OF DRAWINGS

FIG. 8(a) is a side view of a user when wearing an HMD, and FIG. 8(b) is a partial top view of a user when wearing an HMD.

FIG. 18 is an illustration showing an example of screen display at the time of selecting an image.

FIG. 19 is an illustration showing an example of images changed by a gesture operation.

DESCRIPTION OF EMBODIMENTS

First Embodiment

Figure 1:
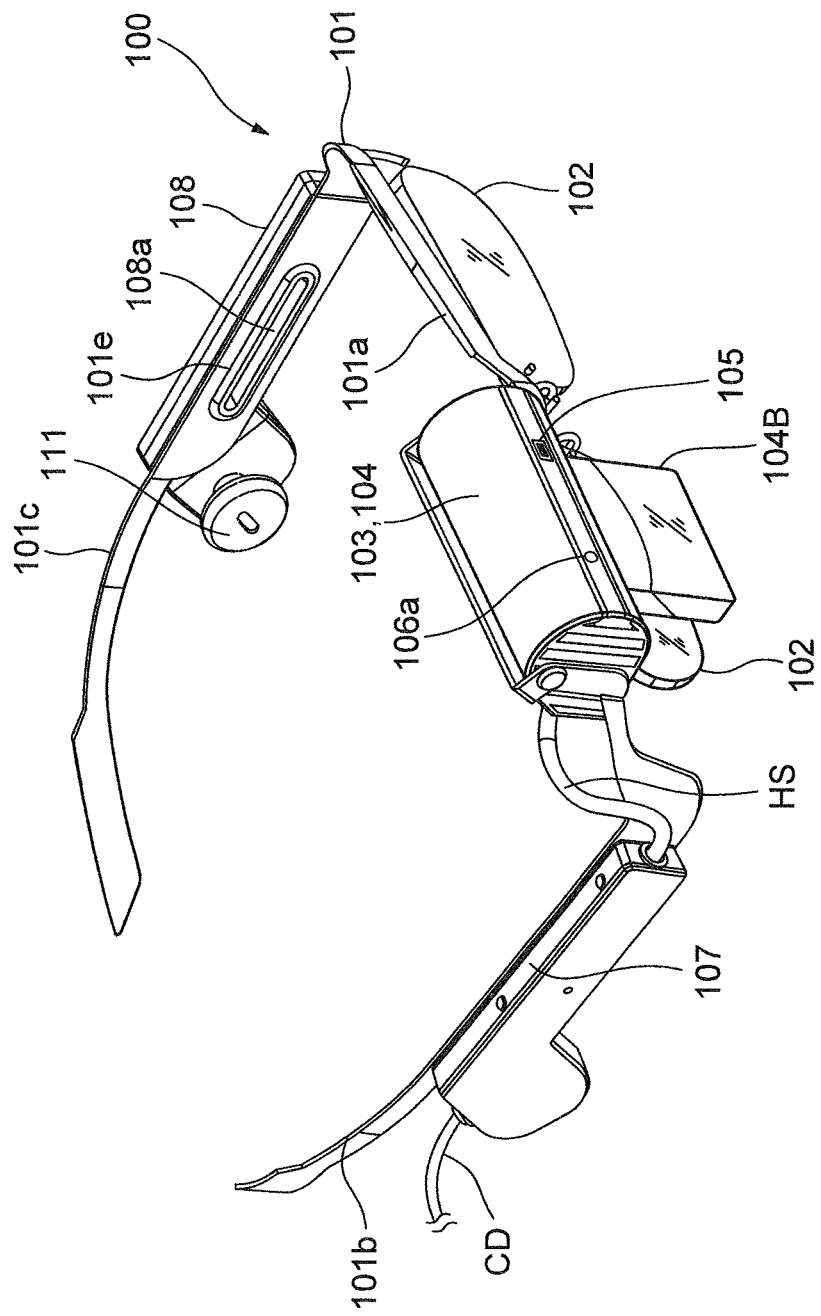
FIG. 1 is a perspective view of a head mounted display (HMD) according to the present embodiment.
Figure 2:
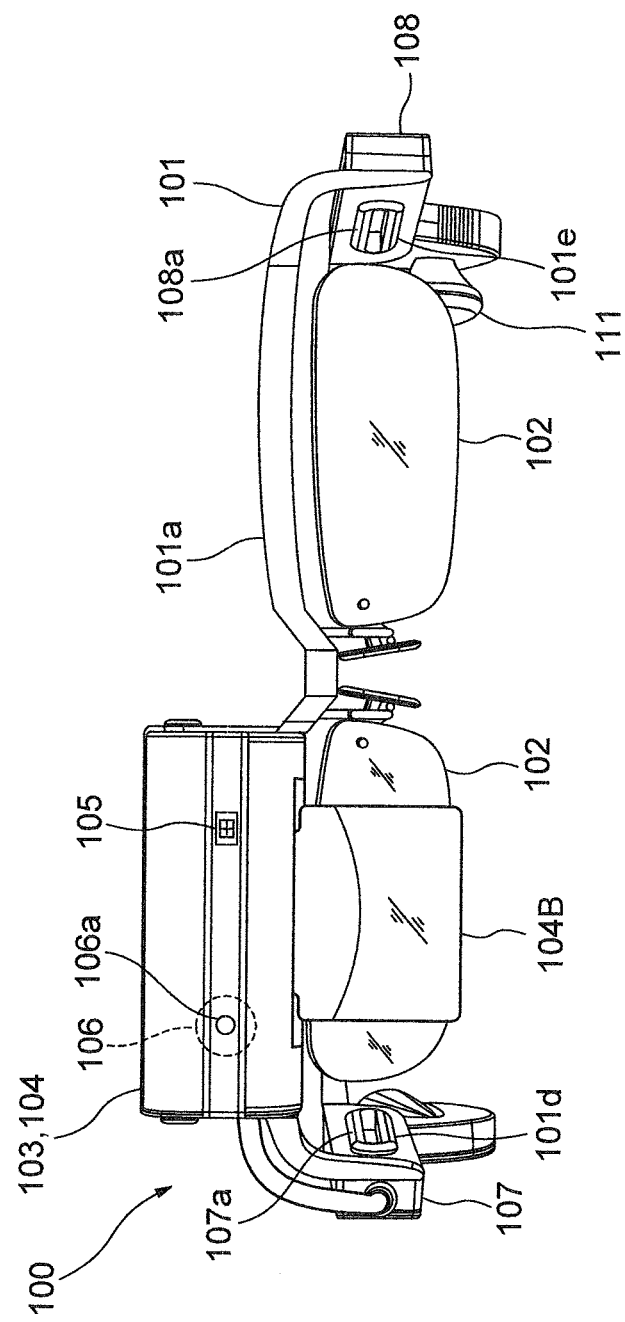
FIG. 2 is a view which looks at an HMD from its front face.
Figure 3:
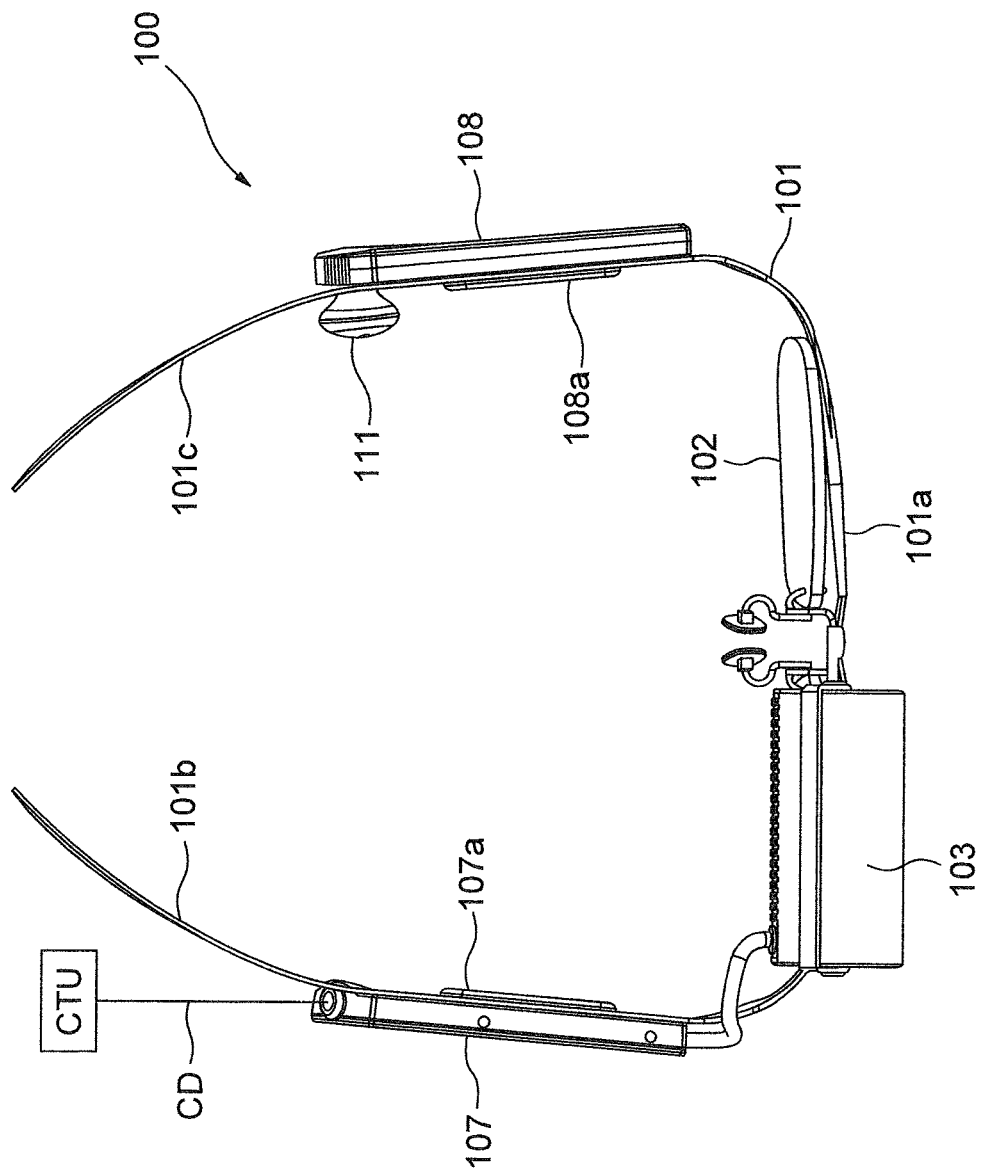
FIG. 3 is a view which looks at an HMD from its top.

Hereinafter, the first embodiment of the present invention will be described with reference to drawings. FIG. 1 is a perspective view of an HMD 100 that is an electronic apparatus including a display unit according to the present embodiment. FIG. 2 is a front view that looks the HMD 100 according to the present embodiment from its front face. FIG. 3 is a top view that looks the HMD 100 according to the present embodiment from its top. Hereinafter, the right side and left of HMD 100 mean respectively the right side and left side of a user wearing the HMD 100.

As shown in FIGS. 1 to 3, the HMD 100 of the present embodiment includes a frame 101 serving as a wearing member. The frame 101 shaped in a "⊐" character-like form when viewed from the top includes an anterior portion 101a to which two eye-glass lenses 102 are attached and side portions 101b and 101c that extend rearward from the both ends of the anterior portion 101a separately. The two eye-glass lenses 102 attached to the frame 101 may have refractive power, and may not have it.

On the upper portion of the right side (the left side may be permissible depending on a user's favourable eye) eye-glass lens 102, a cylindrical main body section 103 is fixed to the anterior portion 101a of the frame 101. On the main body section 103, a display unit 104 is disposed. In the main body section 103, there is arranged a display control section 104DR (refer to FIG. 6 mentioned later) that manages display control for the display unit 104 based on instructions from a processor 121 mentioned later. As required, the display unit may be disposed in front of each of both eyes.

Figure 4:
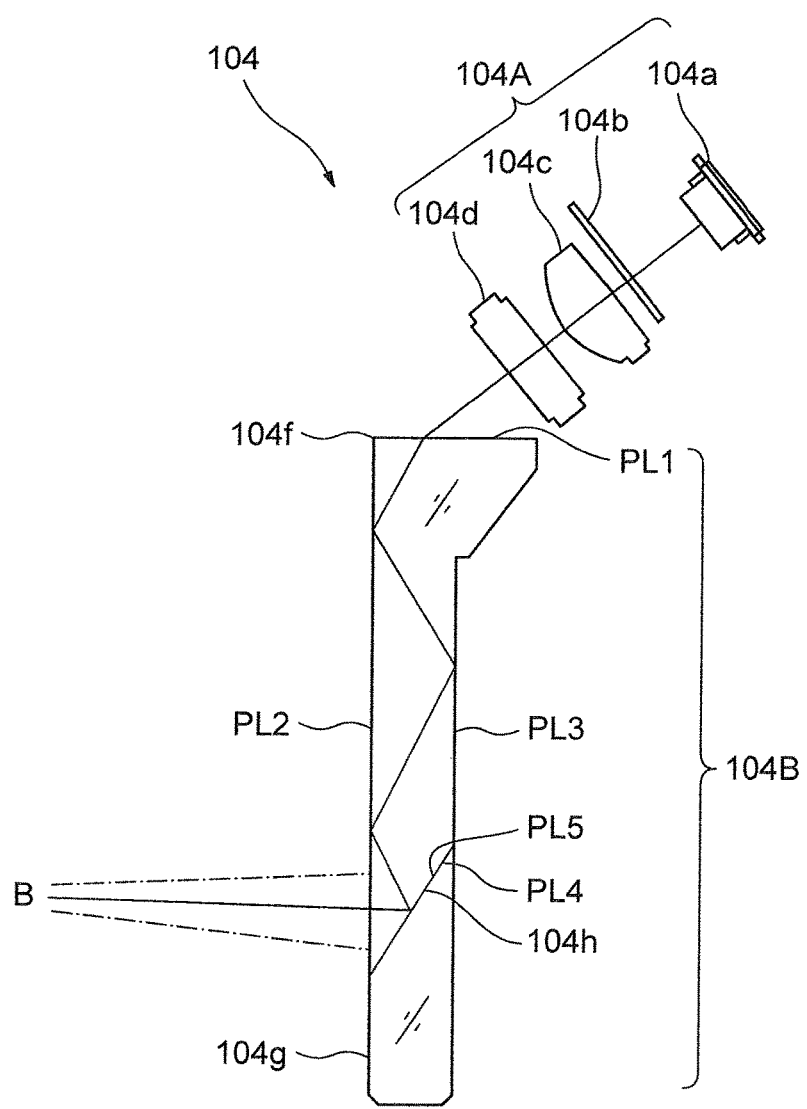
FIG. 4 is an outline cross sectional view showing a constitution of a display unit.

FIG. 4 is an outline cross sectional view showing a constitution of the display unit 104. The display unit 104 includes an image forming section 104A and an image display section 104B. The image forming section 104A is incorporated in the main body section 103, and includes a light source 104a, a one-direction diffusion plate 104b, a condenser lens 104c, and a display element 104d. On the other hand, the image display section 104B being a so-called see-through type display member is shaped overall in a plate arranged to proceed downward from the main body section 103 and to extend in parallel to one of eye-glass lenses 102 (refer to FIG. 1), and the image display section 104B includes an eyepiece prism 104f, a deflection prism 104g, and a hologram optical element 104h.

The light source 104a has a function to illuminate the display element 104d, and includes an RGB integrated type LED that emits light rays of three wavelength band regions which includes, for example, 462±12 nm (B light rays), 525±17 nm (G light rays) and 635±11 nm (R light rays) at the peak wavelength of light intensity and the wavelength width of a light intensity half value. In this way, with the light source 104*a* that emits light rays with the predetermined wavelength widths, image light rays obtained by illuminating the display device 104 can be provided with a predetermined wavelength width. Furthermore, in the case where image light rays are diffracted via a hologram optical element 104*h*, it becomes possible to make a user observe an image at the position of a pupil B over the entire region of an observing field angle. Moreover, the peak wavelength of light rays of each color emitted from the light source 104*a* is set to near the peak wavelength of a diffraction efficiency of the hologram optical element 104*h*, so that improvement in light utilization efficiency has been achieved.

Furthermore, since the light source 104*a* is constituted by LEDs that emits RGB light rays, the cost of the light source 104*a* can be reduced, and, in addition, at the time of illuminating the display element 104*d*, a color image can be displayed on the display element 104*d*, and a user can visually recognize the color image. Moreover, the wavelength width of light rays emitted from each LED element of RGB colors is narrow. Accordingly, by using a plurality of such LED elements, bright image display with high color reproducibility becomes possible.

The display element 104*d* displays images by modulating light rays emitted from the light source 104*a* in accordance with image data, and is constituted by liquid crystal display elements of a light transmission type that include pixels arranged in the form of a matrix so as to form light transmitting regions. It is noted that the display element 104*d* may be of a reflective type.

The eyepiece prism 104*f* totally makes image light rays having entered via a base end surface PL1 from the display element 104*d*, reflected between an inner side surface PL2 and an outer side surface PL3 that oppose in parallel to each other. Furthermore, the eyepiece prism 104*f* introduces the image light rays to a user's pupil via the hologram optical element 104*h*. Meanwhile, the eyepiece prism 104*f* transmits outside light rays and introduces the outside light rays to the pupil of the user. The eyepiece prism 104*f* is made together with the deflection prism 104*g* of, for example, an acrylic-based resin. The eyepiece prism 104*f* and the deflection prism 104*g* have respectively an inclined surface PL4 and an inclined surface PL5 which incline relative to the inner side surface PL2 and the outer side surface PL3, and the inclined surface PL4 and the inclined surface PL5 sandwich the hologram optical element 104*h* therebetween and are joined to each other with an adhesive via the hologram optical element 104*h*.

The deflection prism 104*g* is joined to the eyepiece prism 104*f* such that the deflection prism 104*g* and the eyepiece prism 104*f* are made into one body to form an approximately parallel plate. The deflection prism 104*g* and the eyepiece prism 104*f* that are jointed to each other make it possible to prevent distortion from occurring in an outside world image observed by a user through the display unit 104.

That is, for example, in the case where the deflection prism 104*g* is not joined to the eyepiece prism 104*f*, since outside light rays refract at the time of passing through the inclined surface PL4 of the eyepiece prism 104*f*, distortion occurs in an outside world image observed through the eyepiece prism 104*f*. However, in the case where the deflection prism 104*g* having the complementary inclined surface PL5 is joined to the eyepiece prism 104*f* to form integrally an approximately parallel plate, the refraction of outside light rays at the time of passing through the inclined surfaces PL4 and PL5 (the hologram optical element 104*h*) can be cancelled with the deflection prism 104*g*. As a result, it becomes possible to prevent distortion from occurring in an outside world image observed via a see-through mode. In the case where the eye-glass lens 102 (refer to FIG. 1) is installed between the display unit 104 and a user's pupil, even a user who is usually using eye glasses is also able to observe an image without any problem.

The hologram optical element 104*h* is a volume phase type reflection type hologram that diffracts and reflects image light rays (light rays with wavelengths corresponding to the three primary colors) emitted from the display element 104*d* so as to guide them to the pupil B and enlarges an image displayed on the display element 104*d* so as to introduce the image as a virtual image to a user's pupil. This hologram optical element 104*h* is manufactured, for example, so as to diffract (refract) light rays of three wavelength regions of 465±5 nm (B light rays), 521±5 nm (G light rays), and 634±5 nm (R light rays) at the peak wavelength of diffraction efficiency and the wavelength with of a diffraction efficiency half value. Here, the peak wavelength of diffraction efficiency refers to a wavelength when the diffraction efficiency becomes a peak, and the wavelength width of the half value of the diffraction efficiency refers to a wavelength width when the diffraction efficiency becomes the half value of the peak of the diffraction efficiency.

The reflection type hologram optical element 104*h* has high wavelength selectivity, and diffracts and reflects only light rays with wavelengths within the above-mentioned wavelength regions (in the vicinity of exposure wavelength). Accordingly, outside light rays including wavelengths other than the diffracted and reflected wavelengths are transmitted through the hologram optical element 104*h*, so that high outside light transmission ratio can be realized.

Next, the operation of the display unit 104 is described. Light rays emitted from the light source 104*a* are diffused via the one-direction diffusion plate 104*b*, collected with the condenser lens 104*c*, and enter the display element 104*d*. The light rays having entered the display element 104*d* are modulated for each pixel based on image data input from the display control section 104DR, and emitted as image light rays. With this, a color image is displayed on the display element 104*d*.

The image light rays from the display element 104*d* enter the inside of the eyepiece prism 104*f* from its base end surface PL1, totally reflected multiple times on the inner side surface PL2 and the outer side surface PL3, and enter the hologram optical element 104*h*. The light rays having entered the hologram optical element 104*h* are reflected on there, are transmitted through the inner side surface PL2, and arrive at the pupil B. At the position of the pupil B, the user can observe the enlarged virtual image of the image displayed on the display element 104*d*, and can visually recognize as a screen formed on the image display section 104B. In this case, the hologram optical element 104*h* is deemed to constitute the screen, and also the screen is deemed to be formed on the inner side surface PL2. It should be noted that in this specification, the term "screen" may refer to an image to be displayed.

On the other hand, since the eyepiece prism 104*f*, the deflection prism 104*g*, and the hologram optical element 104*h* transmit almost all the outside light rays, the user can observe an outside world image (a real image) through these. Therefore, the virtual image of the image displayed on the display element 104*d* is observed in a state of overlapping on a part of the outside world image. In this way, the user of the HMD 100 can observe simultaneously an image provided from the display element 104*d* through the hologram optical element 104*h* and an outside world image. When the display unit 104 is in a non-display state, the image display section 104B becomes transparent, and only an outside world image can be observed. In this example, the display unit is constituted by combining the light source, the liquid crystal display element, and the optical system. However, in place of the combination of the light source and the liquid crystal display element, a self-light emitting type display element (for example, organic EL display element) may be used. Furthermore, in place of the combination of the light source, the liquid crystal display element, and the optical system, a transmission type organic EL display panel that has a light transmitting ability in a non-light emission state may be used. In any case, in the case where a screen is arranged so as to come into the view field of a user's eye facing the image display section 104B, preferably is arranged such that at least a part of the screen is overlapped on an effective view field, the user can visually recognize an image easily.

Furthermore, in FIGS. 1 and 2, on the front face of the main body section 103, a proximity sensor 105 arranged closer to the central portion of the frame 101 and a lens 106*a* of a camera 106 arranged closer to the side portion are disposed so as to face forward.

In this specification, the term "proximity sensor" refers to those that detects whether an object, such as a part of a human body (a hand, a finger, etc.) exists in a detection region within a proximity range in front of a detecting plane of a proximity sensor, and outputs signals in order to detect a situation that the object comes close to the front of a user's eye. The proximity range may be set suitably in accordance with the characteristics or preferences of an operator. However, for example, the proximity range may be set at a range in which a distance from a detecting plane of a proximity sensor is 200 mm or less. Since a distance of 200 mm or less from the proximity sensor enables a palm or fingers to be put in or out from the view field of a user in a state that the user has bent an arm, an operation can be performed easily with a gesture using the hand or the fingers, and in addition, there is less fear of erroneously detecting a human body, furniture, etc. other than the user. Here, when an object has come into the detection region within the proximity range in front of the proximity sensor, based on signals output from the proximity sensor, a control circuit determines that the object exists in the proximity range. When an object has come into the detection region, effective signals may be output from the proximity sensor to the control circuit.

There are a passive type and an active type in the proximity sensor. The passive type proximity sensor includes a detecting section to detect invisible light rays or electromagnetic waves emitted from an object when the object is approaching. Examples of the passive type proximity sensor include a pyroelectric sensor that detects invisible lights, such as infrared light rays, emitted from an approaching human body and an electrostatic capacitance a sensor that detects a change in electrostatic capacitance between itself and an approaching human body. The active type proximity sensor includes a projecting section of invisible light rays or sound waves and a detecting section to receive the invisible light rays or the sound waves which are reflected on an object and return. Examples of the active type proximity sensor include an infrared sensor that projects infrared light rays and receives infrared light rays reflected on an object, a laser sensor that projects laser light rays and receives laser light rays reflected on an object, and an ultrasonic sensor that projects ultra sounds and receives ultra sounds reflected on an object. Since the passive type proximity sensor does not need to project energy towards an object, it is excellent in low power consumption. The active type proximity sensor is easy to improve the certainty of detection, for example, even in the case where a user is wearing a glove which does not transmit detection light rays, such as infrared light, emitted from a human body, the active type proximity sensor can detect a movement of a user's hand. Two or more kinds of proximity sensors may be used in combination.

AS compared with a camera, the proximity sensor is generally smaller and cheaper, and its power consumption is also smaller. Although it is difficult for the proximity sensor to perform complicated detection such as detection of the shape of an object, the proximity sensor can discriminate entering of an object into a detection area and leaving of the object from there. Accordingly, a user can perform operations of the HMD with a motion to pass a hand or fingers through the detection area or a motion to hold a palm in front of the detection area. In addition, in the operation, there is no need to perform complicated image processing required for gesture recognition by analysis of images photographed by a camera.

Figure 5:
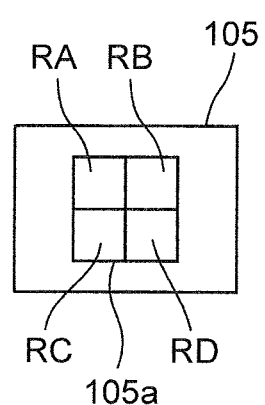
FIG. 5 is an enlarged view of a proximity sensor.

FIG. 5 is an enlarged view of the proximity sensor 105, viewed from its front plane, used in the present embodiment. In the present embodiment, description is given to an example in which a pyroelectric sensor is used as the proximity sensor 105. In FIG. 5, the proximity sensor 105 includes a light receiving section 105*a* that receives invisible light rays, such as infrared light rays emitted from a human body as detection light rays. The light receiving section 105*a* includes light receiving regions RA to RD arranged in the form of two rows and two lines, and at the time of receiving invisible light rays, the light receiving regions RA to RD are configured to output individually their respective signals corresponding to them. The intensity of the output of each of the light receiving regions RA to RD changes in accordance with a distance from the light receiving section 105*a* to an object. That is, as the distance is shorter, the intensity becomes larger. In the case where the proximity sensor 105 is a pyroelectric sensor configured to detect infrared light rays emitted from a human body, the proximity sensor 105 is less likely to detect erroneously an object other than an exposed human body. Accordingly, for example, in the case of working in a narrow place, there is a merit that an erroneous detection can be prevented effectively.

In FIGS. 1 and 2, a right sub-main body section 107 is attached to the side portion 101*b* on the right side of the frame 101, and a left sub-main body section 108 is attached to the side portion 101*c* on the left side of the frame 101. Each of the right sub-main body section 107 and the left sub-main body section 108 is shaped in the form of an elongated plate, and the right sub-main body section 107 and the left sub-main body section 108 include respectively elongated protrusions 107*a* and 108*a* on the respective insides. This elongated protrusion 107*a* is engaged with a long hole 101*d* on the side portion 101*b* of the frame 101 so that the right sub-main body section 107 is attached to the frame 101 in a state of having be positioned, and the elongated protrusion 108*a* is engaged with a long hole 101*e* on the side portion 101*c* of the frame 101 so that the left sub-main body section 108 is attached to the frame 101 in a state of having be positioned.

In the right sub-main body section 107, there are mounted a terrestrial magnetism sensor 109 (refer to FIG. 6 mentioned later) that detects terrestrial magnetism, a gyro that includes an angular velocity sensor and creates output corresponding to an attitude, and an acceleration sensor 110 (refer to FIG. 6 mentioned later), and in the left sub-main body section 108, there are provided a speaker (or earphone) 111A and a microphone 111B (refer to FIG. 6 mentioned later). The main body section 103 and the right sub-main body section 107 are connected with wiring HS so as to be able to transmit signals, and the main body section 103 and the left sub-main body section 108 are connected with unillustrated wiring so as to be able to transmit signals. As schematically illustrated in FIG. 3, the right sub-main body section 107 is connected to a control unit CTU via a cord CD extended from its back end. A 6-axis sensor in which the gyro and the acceleration sensor are integrated into one body, may be used. Furthermore, the HMD may be operated with voices based on output signals created from the microphone 111B in accordance with the input voices. Moreover, the main body section 103 and the left sub-main body section 108 may be constituted to be connected with each other wirelessly.

Figure 6:
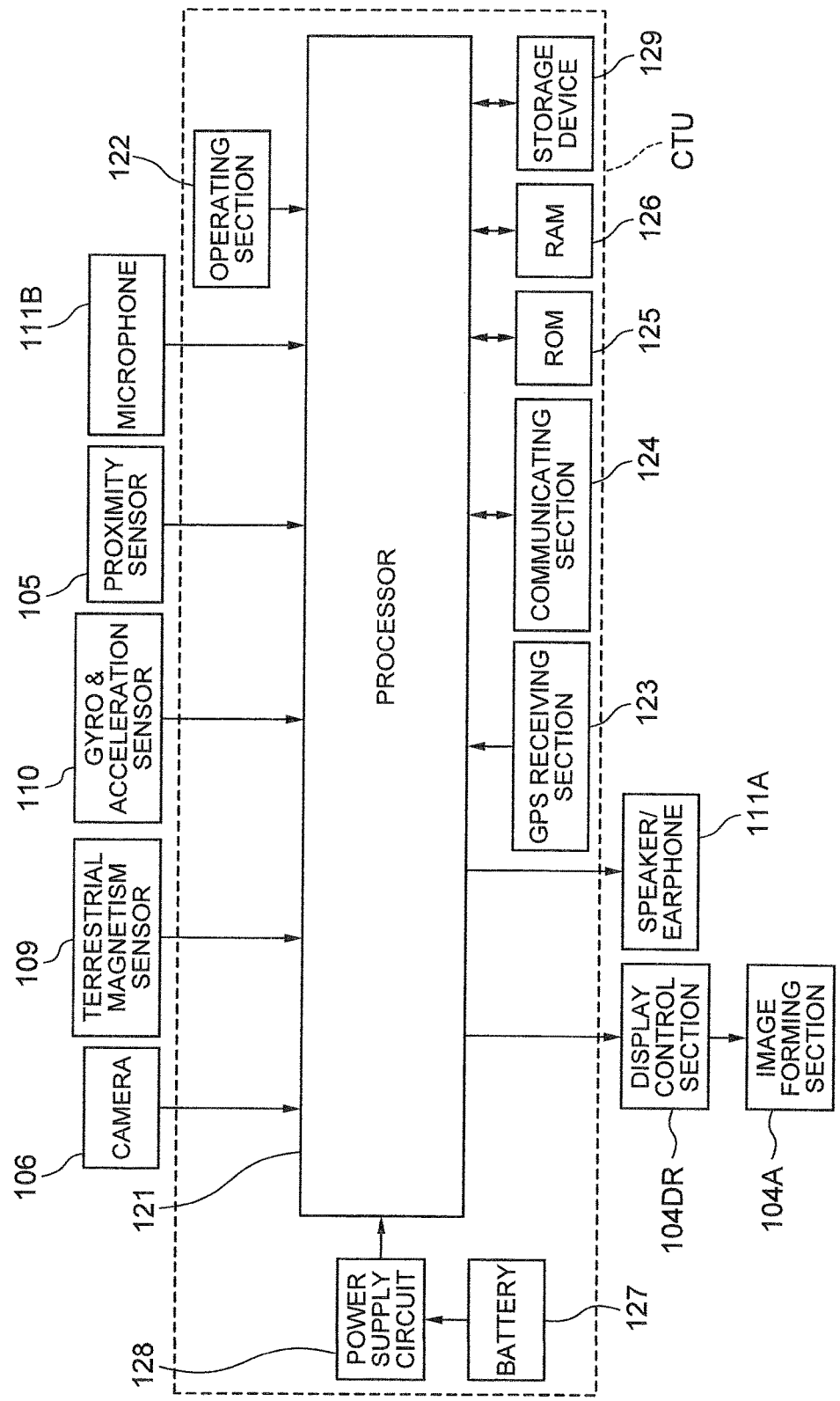
FIG. 6 is a block diagram of a main circuit of an HMD.

FIG. 6 is a block diagram of the main circuit of the HMD 100. The control unit CTU includes a processor 121 serving as a control circuit to control each of functional devices by creating control signals for the display unit 104 and each of devices mentioned later (these are called functional devices); an operating section 122; a GPS receiving section 123 to receive electric waves from GPS Satellites; a communicating section 124 to exchange data with the outside; a ROM 125 to store programs etc.; a RAM 126 to save image data etc.; a power supply circuit 128 and a battery 127 to supply electric power to each section; and a storage device 129, such as SSD and a flash memory. As the processor 121, application processors used in smart phones etc. may be used. However, the kind of the processor 121 is not limited. For example, those in which hardware required for image processing, such as GPU and Codec, is incorporated as a standard specification in an application processor, are a processor suitable for a small HMD.

Furthermore, into the processor 121, when the light receiving section 105a detects invisible light rays emitted from a human body as detection light rays, the signals of them are input from the proximity sensor 105. In addition, the processor 121 controls the image display of the display unit 104 via the display control section 104DR.

The processor 121 is configured to receive electric power supplied from the battery 127 through the power supply circuit 128; to operate in accordance with the programs stored in at least one side of the ROM 124 and the storage device 129; to input image data from the camera 106 in accordance with operation input, such as Power On, from the operating section 122 so as to store the image data in the RAM 126; and to be able to communicate with the outside via the communication section 123, if needed. Furthermore, the processor 121 executes image control according to output from the proximity sensor 105 as mentioned later, whereby a user can perform screen control for the HMD 100 with gesture operations using a hand and fingers.

Figure 7:
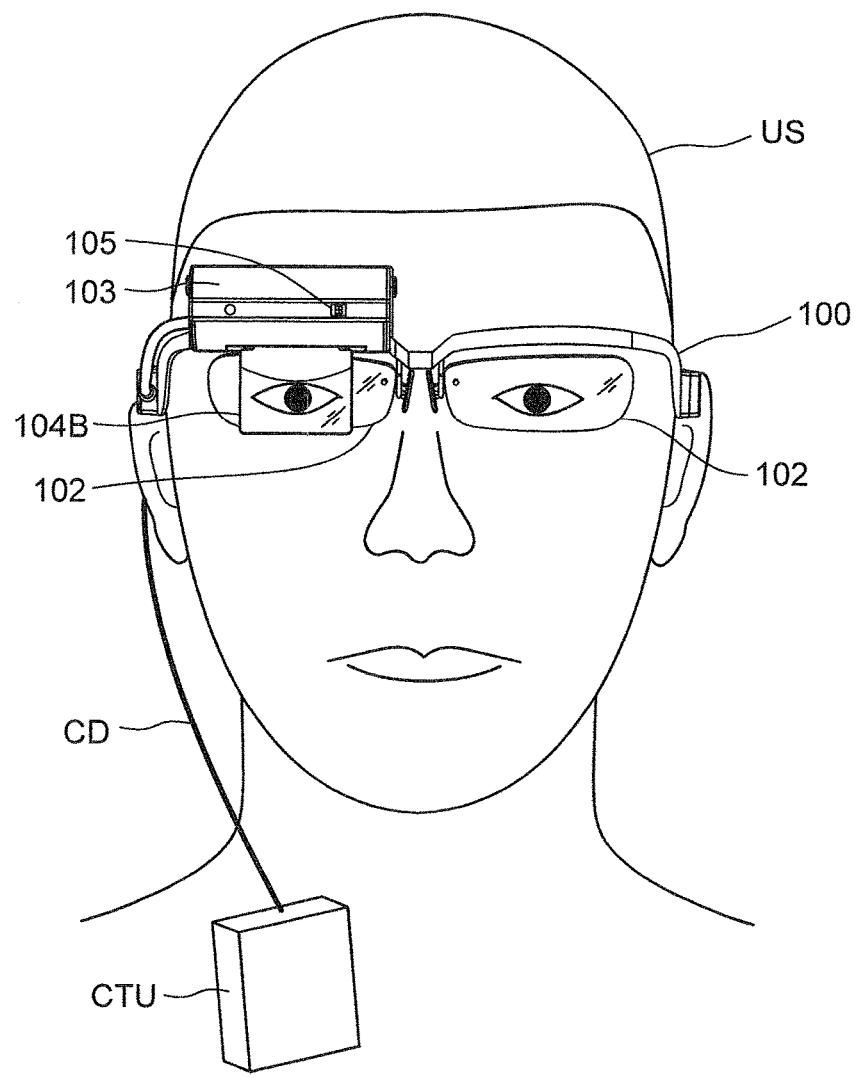
FIG. 7 is a front view of a user when wearing an HMD.
Figure 9:
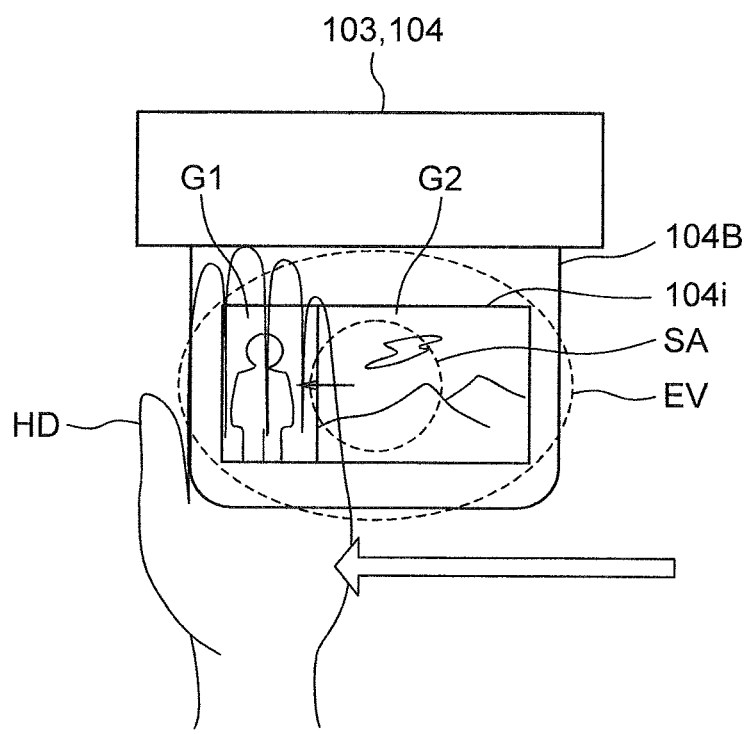
FIG. 9 is an illustration showing an image which a user visually recognizes through a see-through type image display section.

FIG. 7 is a front view showing a situation when a user US wears the HMD 100 according to the present embodiment. FIG. 8(a) is a side view and FIG. 8(b) a top view, each of which shows a situation when a user US wears the HMD 100, together with a user's hand. FIG. 9 is an illustration showing an image which the user US visually recognizes through the image display section 104B of a see-through type. Here, the gesture operation is at least a motion which makes a hand HD or fingers of the user US enter or leave the detection region of the proximity sensor 105, and can be detected by the processor 121 of the HMD 100 via the proximity sensor 105.

As shown in FIG. 9, a screen 104i of the image display section 104B is arranged so as to overlap (here, to be located in the effective view field EV) with an effective view field EV of the user's eyes facing the image display section 104B. Furthermore, the detection region SA of the proximity sensor 105 is located in the view field of the user's eyes facing the image display section 104B. It would be better to adjust the arrangement and orientation of the proximity sensor 105 such that, preferably, the detection region SA is located in a stable fixation field of a user's eye, or in a view field on the inner side of the stable fixation field (about 90 degrees or less in the horizontal direction and about 70 degrees or less in the vertical direction), and more preferably, the detection region SA is located to overlap an effective view field EV located on the inner side more than the stable fixation field or in a view field located in the inner side of the effective view field EV (about 30 degrees or less in the horizontal direction and about 20 degrees or less in the vertical direction).

FIG. 9 shows an example where the detection region SA overlaps the screen 104i. In this way, in a state where the user US wears the frame 101 serving as a wearing member on the head, the detection region SA of the proximity sensor 105 is set so as to be located within the view field of the eyes of the user US, whereby the user US can visually recognize surely the entering and leaving of the hand for the detection-region SA of the proximity sensor 105 without accompanying the movement of eyes while observing the hand HD through the screen 104i. In particular, in the case where the detection region SA of the proximity sensor 105 is located in a stable fixation field or in the view field on the inner side of the stable fixation field, the user can perform a gesture operation surely while visually recognizing the detection region SA even if the user is observing the screen. Moreover, the detection-region SA of the proximity sensor 105 located in the effective view field EV or in the view field on the inner side of the effective view field EV enables the user to perform a gesture operation more surely. The detection region SA located so as to overlap the screen 104i enables the user to perform a gesture operation still more surely. As in the present embodiment, in the case where the proximity sensor includes a plurality of light receiving regions, the whole of the plurality of light receiving regions is deemed as a single light receiving section, and the maximum detection range of the light receiving section is deemed as a detection region. As shown in FIG. 9, in the case where the detection region SA of the proximity sensor 105 is set to overlap the screen 104i, an image showing the detection region SA is displayed on the screen 104i (for example, the range of the detection region SA is indicated with a solid line). With this, since the user can recognize the detection region SA surely, the user can perform operations surely with gestures.

Next, the basic principle of the detection of a gesture operation is described. When the proximity sensor 105 is operating, if there exists nothing in front of the user US, the light receiving section 105a does not receive invisible light rays as detection light rays. Accordingly, the processor 121 determines that a gesture operation is not performed. On the other hand, as shown in FIG. 8, if the hand HD of the user US itself is made to approach in front of the eyes of the user US, the light receiving section 105a detects invisible light rays emitted from hand HD. Accordingly, in response to output signals from the proximity sensor 105 based on this detection, the processor 121 determines that a gesture operation has been performed. In the following, description is given on the assumption that gesture operations are performed by a hand HD of a user. However, in place of the hand HD, fingers or the other part may be used, or gesture operations may be performed by a user by using an instruction tool composed of materials that can emit invisible light rays.

As mentioned above, the light receiving section 105a includes the light receiving regions RA to RD arranged in the form of two rows and two lines (refer to FIG. 5). Therefore, in the case where the user US makes the hand HD approach in front of the HMD 100 from either of the rightward, leftward, upward or downward direction, the output timing of each of signals detected by the light receiving regions RA to RD differs from the others.

Figure 10:
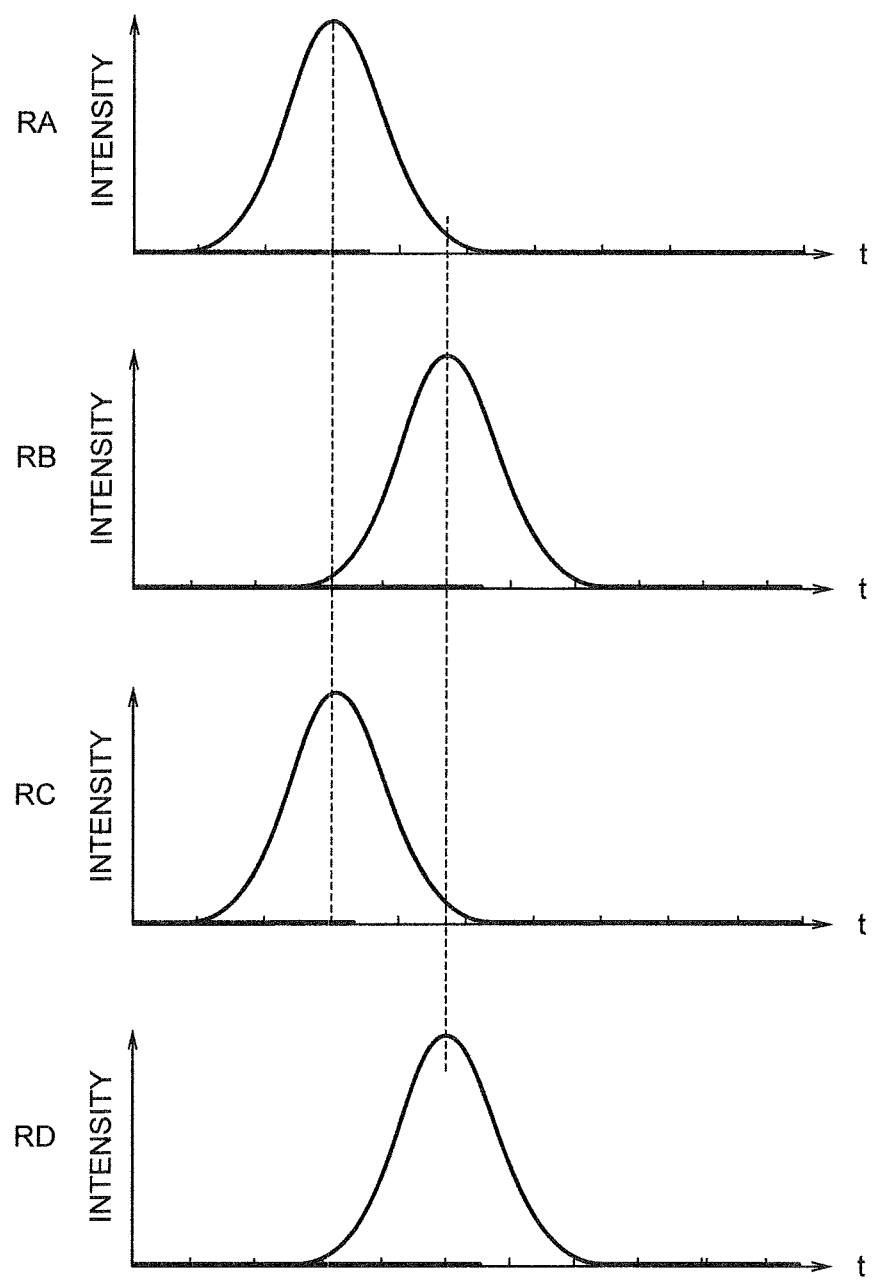
FIG. 10 is a diagram showing an example of signal waveforms output from a plurality of light receiving regions.
Figure 11:
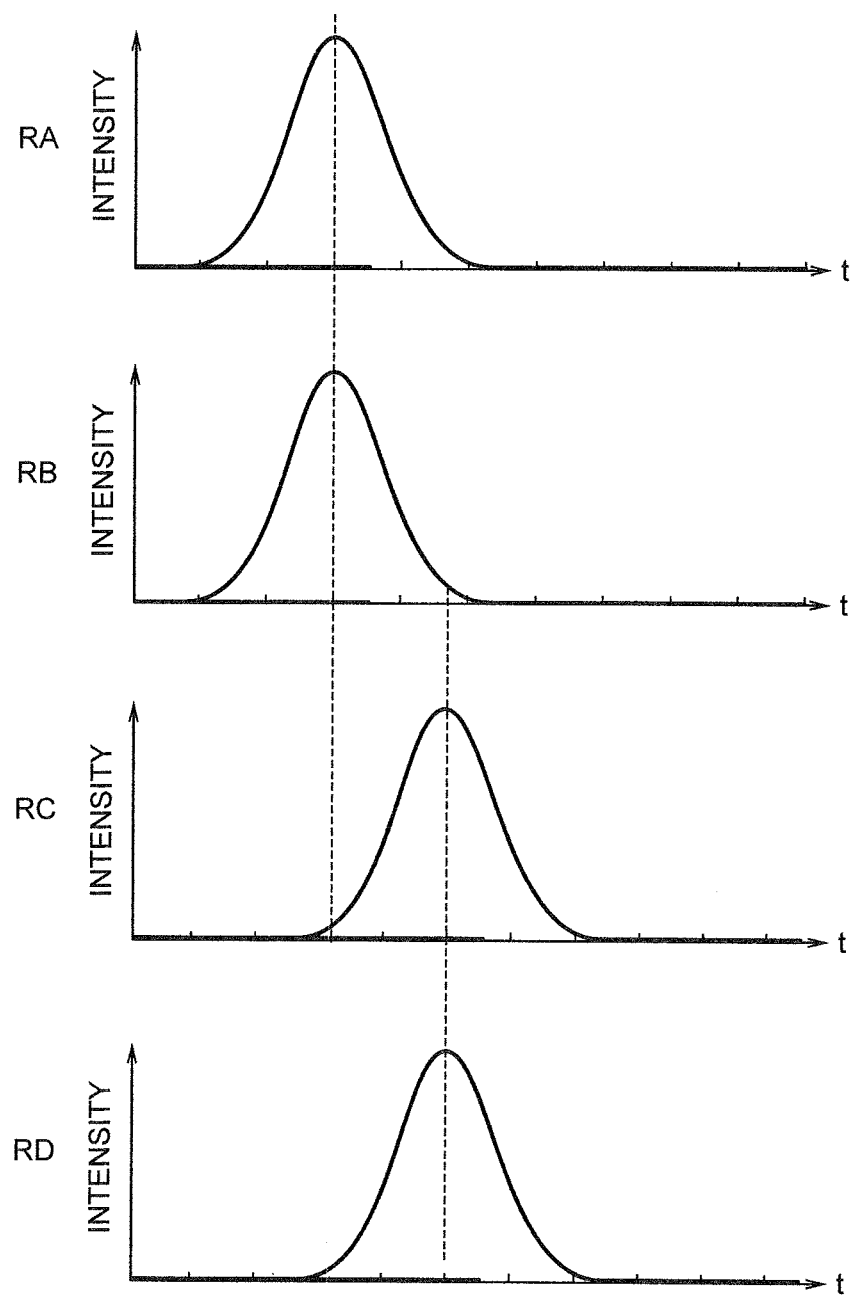
FIG. 11 is a diagram showing another example of signal waveforms output from a plurality of light receiving regions.
Figure 12:
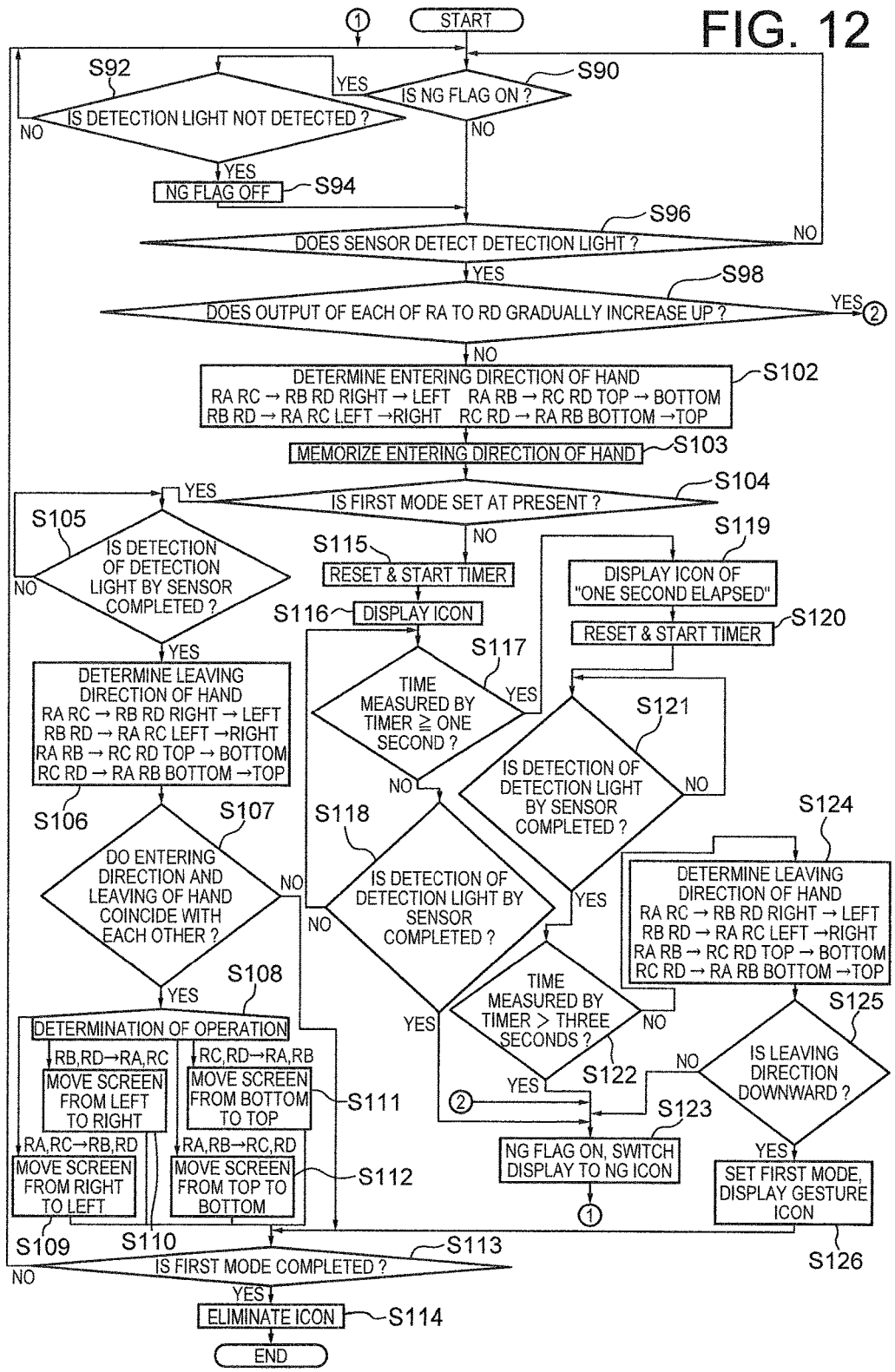
FIG. 12 is a flowchart showing screen display control processing executed by a processor based on a gesture operation.
Figure 13:
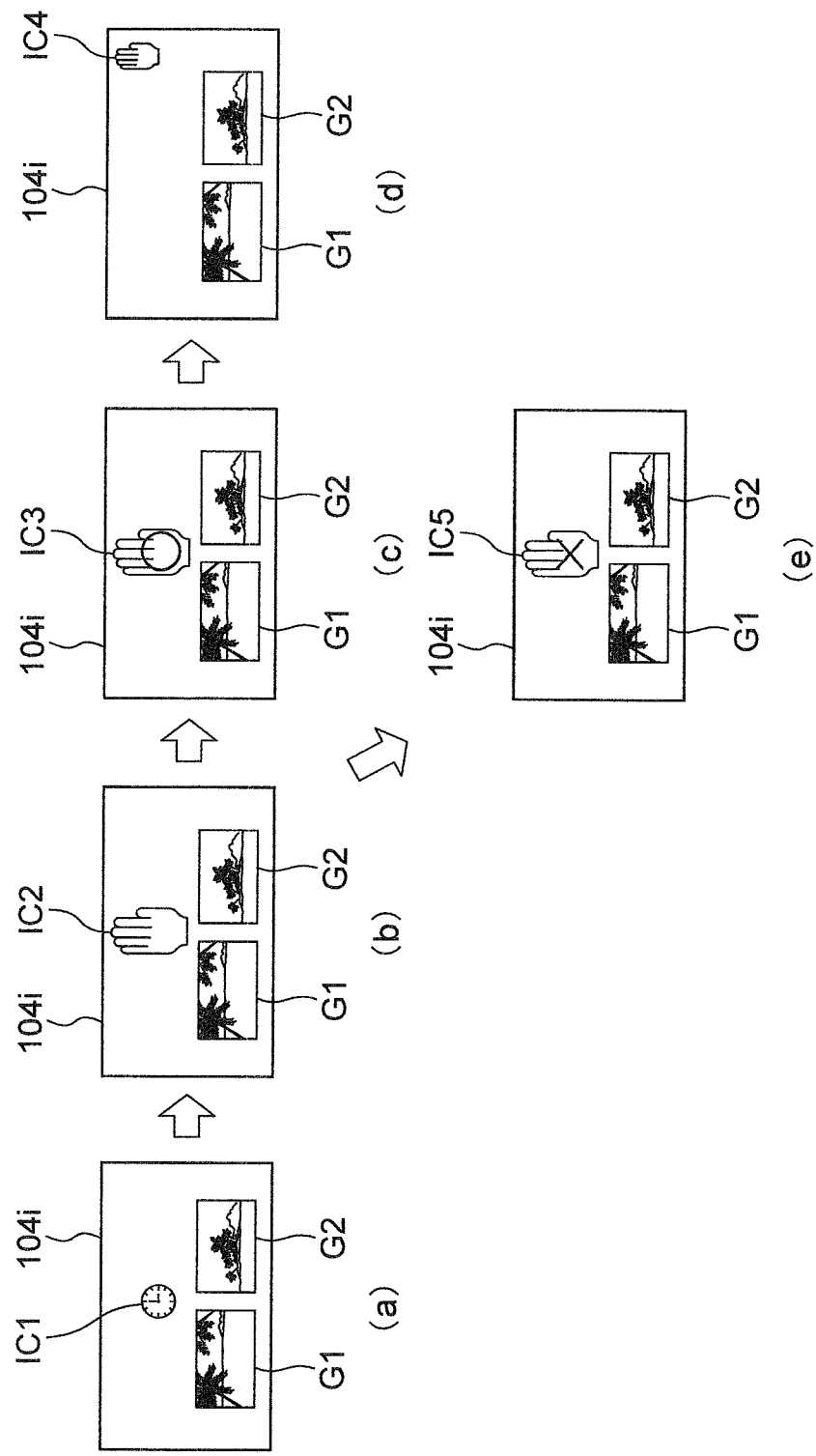
FIG. 13 is an illustration showing an example of screen display at the time of setting a first mode.

FIGS. 10 and 11 each shows an example of signal wave forms of the light receiving regions RA to RD by taking the signal strength of each of the light receiving regions RA to RD on the axis of ordinate and taking time on the axis of abscissa. For example, with reference to FIG. 8 and FIG. 9, in the case where the user US moves the hand HD from the right toward the left in front of the HMD 100, invisible light rays emitted from the hand HD enters the light receiving section 105a. At this time, invisible light rays are first received by the light receiving regions RA and RC. Therefore, as shown in FIG. 10, first, the signals of the light receiving regions RA and RC rise, then, after some delay, the signals of the light receiving regions RB and RD rise. Further, after the signals of the light receiving regions RA and RC have fallen, the signals of the light receiving regions RB and RD fall. Then, the processor 121 detects the timing of each of these signals, and determines that the user US has performed the gesture operation by moving the hand HD from the right to the left. Along with this, as shown in FIG. 9, the processor 121 can control the display control section 104DR such that a display is changed so as to perform page turning from an image G1 to an image G2 in synchronization with the movement of the hand HD.

In the example of FIG. 11, first, the signals of the light receiving regions RA and RB rise, then, after some delay, the signals of the light receiving regions RC and RD rise. Further, after the signals of the light receiving regions RA and RB have fallen, the signals of the light receiving regions RC and RD fall. Then, the processor 121 detects the timing of each of these signals, and determines that the user US has performed the gesture operation by moving the hand HD from the top to the bottom.

According to this embodiment, a proximity sensor is used, and the detection regions of the proximity sensor are located in the view field of the user's eyes facing an image display section, whereby the existence and movement of the hand HD can be detected surely. Therefore, the user US can observe the movement of the hand and an operation by interlocking them, so that an intuitive operation can be realized. Furthermore, the proximity sensor is small, and its power consumption is lower than a camera, so that the continuous operation time of the HMD 100 can be made longer.

Figure 15:
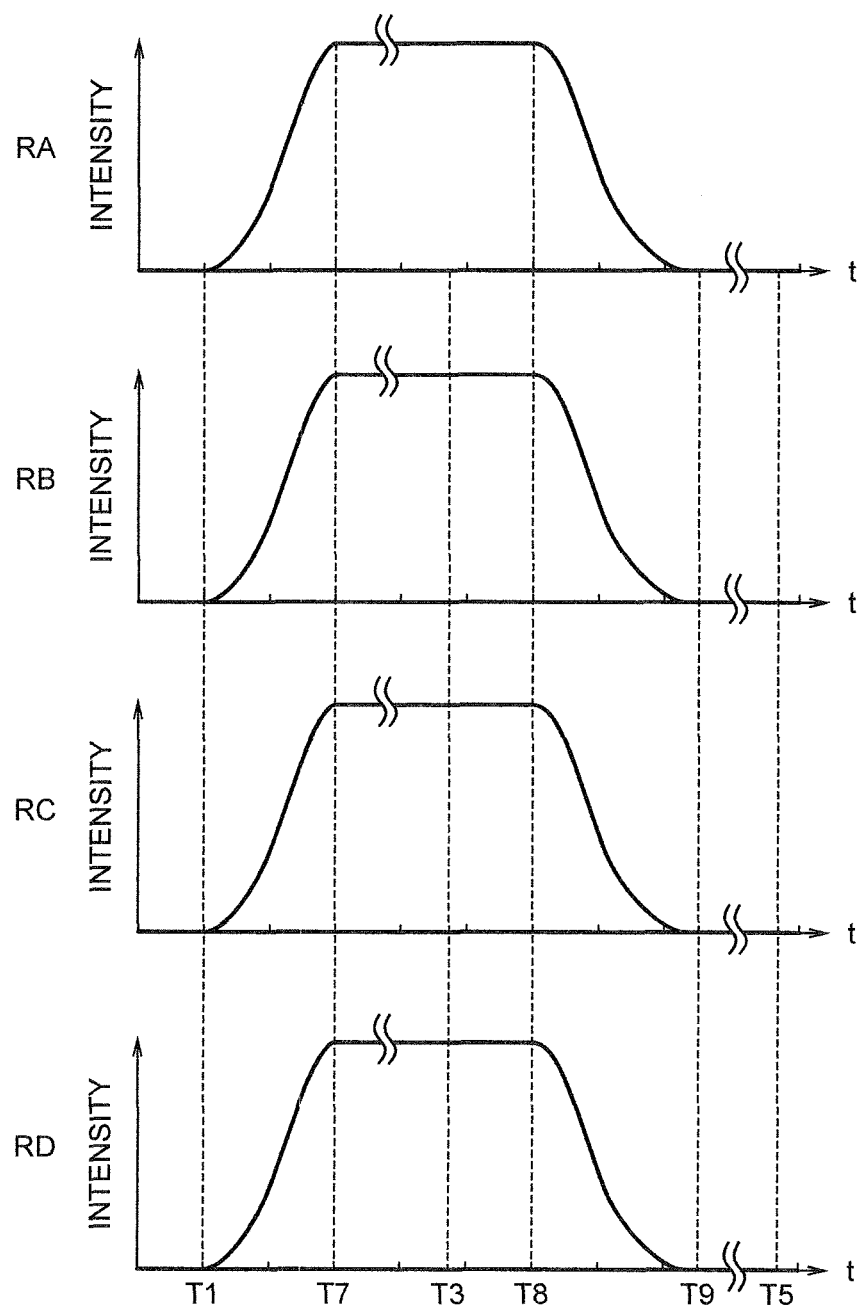
FIG. 15 is a diagram showing another example of signal waveforms output from a plurality of light receiving regions.

Incidentally, in the present embodiment, the proximity sensor 105 has the characteristics that an output may increase or decrease in accordance with a distance between the hand HD in the detection region SA and the proximity sensor 105. Accordingly, as shown in FIG. 15, there may be a case where the outputs of all the light receiving sensors begin rising from a zero level almost simultaneous at time T1 and continue the rising gradually by time T7. In this case, it is determines that a user has not started gesture recognition by using a hand or an instruction tool, but an unrelated object have approached the HMD 100. The details will be mentioned later.

In the case where the power consumption of the HMD 100 is required to be reduced more, or in the case where an operation by a user interface other than a gesture operation is required to be prioritized, the detection of a gesture operation may be interrupted temporarily by stopping execution of the detection processing of a gesture by the processor 121 and power supply to the proximity sensor.

In the present embodiment, the processor 121 can execute a first mode to execute a first control with regard to at least one functional device or the processor 121 itself in response to the output of the proximity sensor 105 corresponding to a first movement of an object relative to the proximity sensor 105 (that is, the movement of a hand of a user in front of the proximity sensor 105. Furthermore, the processor 121 can execute a second mode to skip the first control relative to the output of the proximity sensor 105 corresponding to the first movement. In the case where the processor 121 is set the first mode, when the user wearing the HMD 100 performs a predetermined first movement by moving a hand in front of a face, the proximity sensor 105 creates an output corresponding to the movement of the hand, and the processor 121 executes the first control with regard to at least one functional unit or the processor 121 itself in response to the output. In the present embodiment, the first movement of the object is, for example, a swipe operation by a hand. However, the first movement is a different movement from a second movement mentioned later.

In the present embodiment, the first control is, for example, a screen display control, such as page feeding according to the first movement by a hand of user, such as the above-mentioned swipe operation. If an animation is displayed so as to slide former and later page images in synchronization with the swipe operation, a user can visually recognize a screen display and an operation so as to move interlockingly with each other by moving a hand HD in front of the display screen while looking at the display screen of the display unit 104. Therefore, a user interface easy to use can be offered. Moreover, the processor 121 switches from the second mode to the first mode based on an output of the proximity sensor 105 corresponding to a second movement of an object relative to the proximity sensor 105 and different from the above-mentioned first movement. Here, the above-mentioned second movement is an operation which makes an object leave from a detection region within a second time from there after having made the object stayed for a first time at the detection region of the proximity sensor 105. In concrete terms, after a user has held a hand in front of the HMD for a certain period of time, the second movement is an operation which makes a hand leave from there. In order to distinguish this operation from a case where an object different from a user or the HMD enters the detection region SA, or a gesture operation to perform a screen operation, the operation is made a movement more complicated than a movement which passes a detection region or approaches toward a detection region from a distant place.

In the case where the processor 121 has set the second mode, even if the proximity sensor 105 creates an output corresponding to the above-mentioned first movement, the processor 121 skips the above-mentioned first control. With the memorization of the second movement by a user, it becomes possible to switch from the second mode to the first mode with a non-contact manner. With this, when a control via a gesture input is required, an input by the proximity sensor 105 can be performed, and a control of a functional device or the processor 121 self can be made to perform in accordance with the first movement.

The first control skipped in the second mode does not include a display or the like to indicate for a user a situation that the setting of the first mode has been skipped. That is, even though a control operation is common in a point of a screen control, but if the control operation performs a screen control different that performed in accordance with the first movement in the first mode, the control operation is not skipped in the second mode.

Furthermore, as in the present embodiment, in the case where the proximity sensor 105 has the characteristics that an output increases or decreases in accordance with a distance between a hand HD and the proximity sensor 105 in the detection region SA, when, for example, the processor 121 detects based on the output of this proximity sensor 105 that the distance between the hand HD and the proximity sensor 105 in the detection region SA is, for example, less than 50 mm as the outside of the range of a reference level (50 to 200 mm), the first control in response to the first movement of a hang of a user mentioned later may be made not to be performed in order to reduce a fear of erroneous detection. In addition, at this time, a warning mark showing that the position of the detected hand HD is too close, may be displayed on the screen 104i.

Next, with reference to FIGS. 12 to 15, description will be given to screen display control processing that includes a control method for the HMD 100 as an electronic apparatus and is executed by the processor 121 based on a gesture operation. The processor 121 executes the screen display control in accordance with the control program stored in at least one of the ROM 124 and the storage device 129. In the present embodiment, after the hand HD has stayed at the detection region for one second or more regardless of a direction in which the hand HD has entered the detection region of the proximity sensor 105 (that is, a first direction corresponds to all the directions), when the hand HD leaves downward as a second direction within three seconds, the first mode is set. That is, this series of movements is the second movement. During the setting of the first mode, the processor 121 performs the screen display control being the predetermined first control in response to the output signals of the proximity sensor 105 corresponding to the above-mentioned first movement. On the other hand, when the second mode is being set, for example, even if the proximity sensor 105 outputs signals showing a situation that an object has stayed at the detection region in a non-operative state for three seconds or more due to the placing of the HMD 100 on the wall side and so on, the processor 121 does not perform switching to the first mode. Furthermore, even if signals corresponding to the first movement are created, the processor 121 does not perform the above-mentioned screen display control as the first control. With this, an erroneous operation such as starting the first mode against the intention of a user can be prevented. As mentioned above, all the screen controls are not prohibited in the second mode. A screen control different from the screen control performed in response to the first movement by a user's hand in the first mode, for example, a screen control to display an icon to notify a user of a situation that the setting of the first mode has not been received, can be performed without being skipped. In the example shown in FIG. 13, images G1 and G2 are displayed on the screen 104i. However, the display of the images G1 and G2 is arbitrary, and these images do not necessarily need to be displayed.

Next, the screen display control processing performed by the processor 121 is described in detail based on a flowchart. In the flowchart shown in FIG. 12, first, in Step S90, the processor 121 determines whether an NG flag mentioned later is turned ON at present. When a situation that an object has entered a detection range of the proximity sensor 105 has been continued for three seconds or more, the NG flag is turned ON. Successively, when the NG flag is being ON, after having confirmed (Yes in Step S92) that detection light rays (here, invisible light rays) are not detected, the processor 121 turns OFF the NG flag in Step S94. If the detection light rays have been being detected continuously in Step S92, the flow returns to Step S90.

Next, in Step S96, the processor 121 waits until the light receiving section 105a detects detection light rays. Subsequently, when the light receiving section 105a detects detection light rays, in Step S98, the processor 121 determines whether the outputs of all the light receiving sensors are rising gradually as shown in FIG. 15. In the case where the processor 121 determines it as Yes in Step S98, the processor 121 determines that an instruction is not made by a user's hand, and the flow is made to proceed to Step S123 mentioned later. In the case where the processor 121 determines it as No in Step S98, the flow is made to shift to Step S102, and the processor 121 determines the entering direction of the hand HD as follows based on the timing of the signal of each of the regions RA to RD.

(1) In the case where the signals of the regions RA and RC rise first, and then the signals of the regions RB and RD rise: the hand HD has entered in a direction from the right toward the left.

(2) In the case where the signals of the regions RB and RD rise first, and then the signals of the regions RA and RC rise: the hand HD has entered in a direction from the left toward the right.

(3) In the case where the signals of the regions RA and RB rise first, and then the signals of the regions RC and RD rise: the hand HD has entered in a direction from the top toward the bottom.

(4) In the case where the signals of the regions RC and RD rise first, and then the signals of the regions RA and RB rise: the hand HD has entered in a direction from the bottom toward the top.

In Step S103, the processor 121 memorizes the determined entering direction of the hand HD. Then, in Step S104, the processor 121 determines whether the first mode has been set, and in the case where the processor 121 determines that the first mode has been released (that is, the second mode has been set), in the following Step S115, the processor 121 resets a built-in first timer and makes it start, and furthermore, in Step S116, as shown in FIG. 13(a), the processor 121 displays an icon IC1 shaped in the form of a clock on the center of the screen 104i. When the user visually recognizes the icon IC1 on the screen 104i, the user notices that it is detected that the hand HD has entered the detection region of the proximity sensor 105 and that the time measurement of the holding time of it has been started. In this connection, the icon IC1 may not be displayed.

In Step S117, the processor 121 determines whether the time measured by the first timer has become one second (the first time) or more. In the case where the time measured by the first timer is less than one second, unless the light receiving section 105a determines that detection light rays are not detected in Step S118, the processor 121 returns the flow to Step S117.

In the case where the processor 121 determines that the time measured by the first timer has become one second or more, since the measured time shows a situation that the light receiving section 105a is continuing to detect detection light rays, it can be confirmed that the hand HD had stayed at the detection region of the proximity sensor 105 for one second or more. Then, the processor 121 stops the time measurement by the first timer, proceeds to Step S119, and displays an icon IC2 shaped in the form of a hand as shown in FIG. 13(b) on the center of the screen 104i in place of the icon IC1 (a first screen display). With the visual recognition of the icon IC2, the user US notices that a first stage for a first mode setting operation has been cleared by holding the hand HD at the detection region for one second or more.

Figure 14:
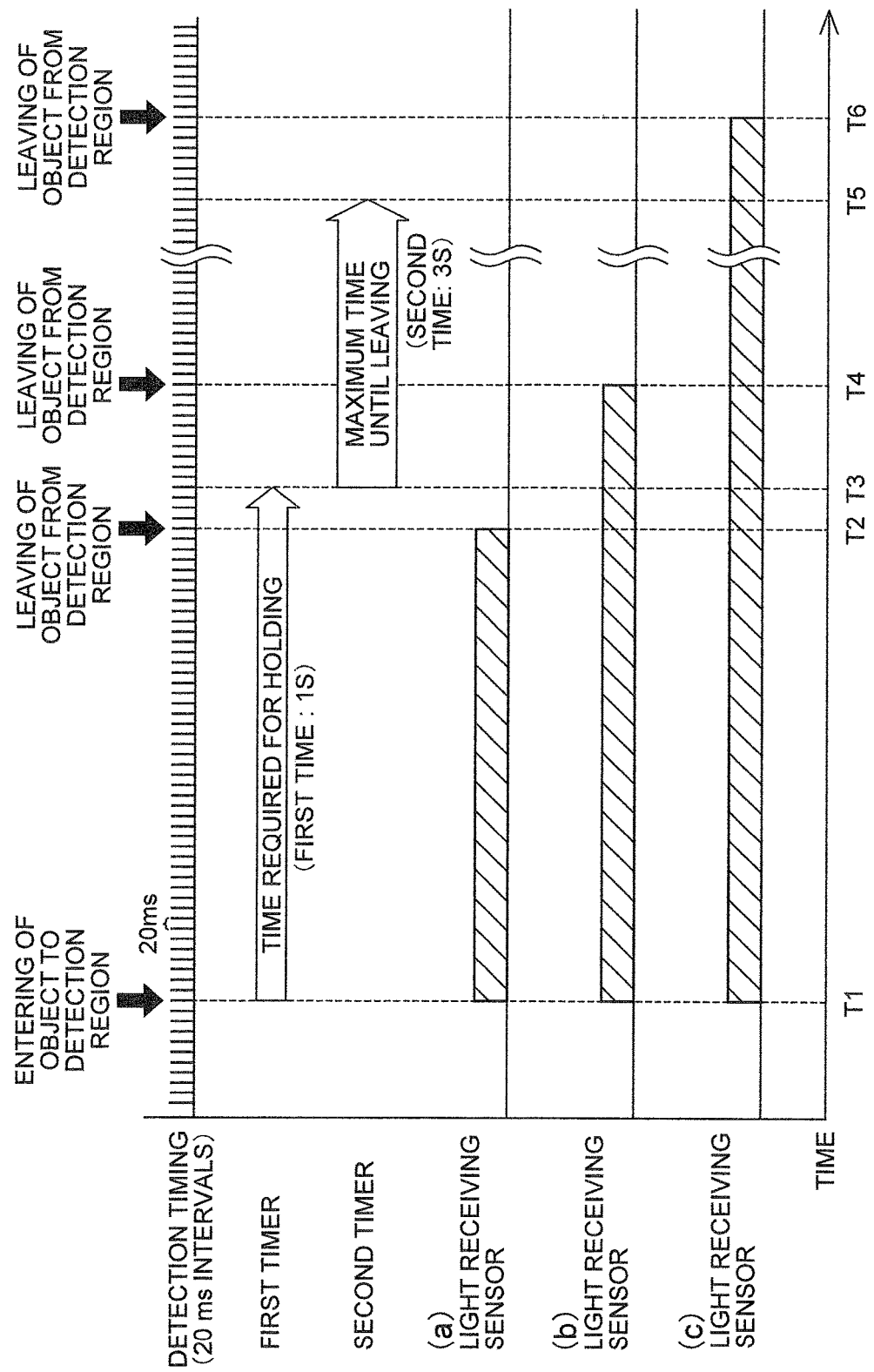
FIG. 14 is a time chart showing detection timing at the time of setting a first mode.

FIG. 14 is a time chart showing a situation of signal detection. As shown in FIG. 14, the processor 121 detects the signals of the proximity sensor 105, for example, with 20 millisecond intervals. In the case where the user's hand has stayed for one second or more (time T3) in the detection region SA after the hand has entered there (time T1), since the output from the light receiving sensor has become an ON state at a time point of time T3, the determination in Step S117 mentioned above is made to Yes.

Furthermore, the processor 121 resets and starts a built-in second timer in Step S120. Then, in Step S121, the processor 121 waits until the light receiving section 105a does not detect detection light rays. In the case where the light receiving section 105a does not detect detection light rays, in Step S122, the processor 121 determines whether the time measured by the second timer has exceeded three seconds (a second time). As the second timer, the first time having stopped the time measurement may be used. At least one of the first time and the second time is arbitrarily adjustable within 0.5 to 5 seconds via, for example, an operation from the operating section 122. Thus, the processor 121 receives an instruction from a user, and makes at least one of the first and second times adjustable based on this instruction, whereby it becomes possible to reduce burdens of the user holding a hand and to match them with a user's preference. At least one of the first and second times may be made to a fixed value.

In the case where, in Step S122, it has been determined that the time measured by the second timer is three seconds or less, it can be presumed that the hand HD has left from the detection region of the proximity sensor 105 within three seconds, in Step S124, the processor 121 determines the leaving direction of the hand HD as follows based on the timing of the signal of each of the regions RA to RD.

(5) In the case where the signals of the regions RA and RC rise first, and then the signals of the regions RB and RD rise: the hand HD has left in a direction from the right toward the left.

(6) In the case where the signals of the regions RB and RD rise first, and then the signals of the regions RA and RC rise: the hand HD has left in a direction from the left toward the right.

(7) In the case where the signals of the regions RA and RB rise first, and then the signals of the regions RC and RD rise: the hand HD has left in a direction from the top toward the bottom.

(8) In the case where the signals of the regions RC and RD rise first, and then the signals of the regions RA and RB rise: the hand HD has left in a direction from the bottom toward the top.

As shown in FIG. 14(b), in the case where a user's hand has left from the detection region SA at time T4 within three seconds (time T5) after the hand has stayed in the detection region SA for one second or more from the entering of the hand (time T1) into the detection region SA, since the output from the light receiving sensor becomes an OFF state, the determination in Step S121 mentioned above is made Yes, and the determination in Step S122 is made No.

Furthermore, in Step S125, the processor 121 determines whether the leaving direction of the hand HD is downward. In the case where it has been determined that the leaving direction of the hand HD is downward, the processor 121 presumes that the user US desires the setting of the first mode, and sets the first mode in Step S126. Moreover, as shown in FIG. 13(c), the processor 121 displays an icon IC3 in which a round mark is superimposed on the mark of a hand on the center of the screen 104i in place of the icon IC2 (a second screen display different from the first screen display). With the visual recognition of the icon IC3, the user US notices that the setting of the first mode has been received. Thereafter, as shown in FIG. 13(d), the processor 121 displays a small icon IC4 shaped in the form of a hand showing that the first mode is being set, on the upper right portion of the screen 104i in place of the icon IC3. Thereafter, the flow shifts to Step S113. Based on the shift from the screen of FIG. 13(b) to the screen of FIG. 13(d), sine the user can recognize that the first mode has been set, the display of the icon IC3 shown in FIG. 13(c) may be omitted.

On the other hand, in the case where, in Step S125, it has been determined that the leaving direction of the hand HD is a direction other than the downward direction, there is a fear of erroneous detection. Accordingly, the processor 121 shifts the flow to Step S123, and turns ON the NG flag. Successively, as shown in FIG. 13(e), the processor 121 displays an icon IC5 in which a mark of x is superimposed on the mark of a hand on the center of the screen 104i in place of the icon IC2. With the visual recognition of the icon IC5, the user US can notice that the setting of the first mode has not been performed. The icon IC5 is displayed only for a predetermined period of time (for example, two seconds), and thereafter, the icon IC5 is eliminated. Subsequently, the flow shifts to Step S101.

Moreover, also in the case where, in Step S122, it has been determined that the time measured by the second timer exceeds three seconds (that is, as shown in FIG. 14(c), in the case where the hand has left from the detection region SA at time T6 after the above-mentioned time T5), since the time until the hand has left is too long, it is determined that the movement is not the second movement by the user. Then, the processor 121 shifts the flow to Step S123 without determining the leaving direction of the hand. Accordingly, in the case where the HMD 100 is placed on the wall side or another object is placed in front of the HMD 100 placed on a desk, it becomes possible to prevent a situation that the first mode is set and the HMD 100 starts a gesture recognition unintentionally.

Furthermore, in a state where the first mode has not been set (that is, the second mode has been set), when the time measured by the first timer is less than one second (No in Step S117), in the case where, in Step S118, the light receiving section 105a determines that detection light rays are not detected (as shown in FIG. 14 (a), in the case where the hand has left from the detection region SA at time T2 before the above-mentioned time T3), the processor 121 shifts the flow to Step S123.

Also, in the case where, in Step S98, the determination has been made No, the flow is shifted to Step S123. Accordingly, even if the outputs of all the light receiving sensors gradually lower and change to a zero level during a period of time after time T3 at which the first timer has measured one second from the time T1 and up to time T5 at which the second timer measures three second from the time T3, the first mode is not set. For example, assuming a case where a user wearing the HMD 100 approaches an inspection object for the purpose of a check work, it is considered that the possibility that all the light receiving sensors of the proximity sensor 105 simultaneously gradually raise the output from the zero level, is a high. For this reason, by determining such that a way of making an object enter such that the outputs of all the sensors increase gradually from a zero level is not performed by a movement of a user's hand, it is possible to reduce surely occurrence of an erroneous operation.

On the other hand, in the case where, in Step S104, it has been determined that the first mode has been set, the processor 121 presumes that the gesture operation determined in Step S102 has been made for the purpose of the screen display control. Then, in Step S105, the processor 121 waits until the light receiving section 105a determines that detection light rays are not detected. In the case where detection light rays are not detected, in order to determine a gesture operation so as to match the entering direction of the hand stored in Step S103, in Step S106, the processor 121 determines the leaving direction of the hand HD as follows based on the timing of the signal of each of the regions RA to RD.

(9) In the case where the signals of the regions RA and RC rise first, and then the signals of the regions RB and RD rise: the hand HD has left in a direction from the right toward the left.

(10) In the case where the signals of the regions RB and RD rise first, and then the signals of the regions RA and RC rise: the hand HD has left in a direction from the left toward the right.

(11) In the case where the signals of the regions RA and RB rise first, and then the signals of the regions RC and RD rise: the hand HD has left in a direction from the top toward the bottom.

(12) In the case where the signals of the regions RC and RD rise first, and then the signals of the regions RA and RB rise: the hand HD has left in a direction from the bottom toward the top.

Furthermore, in Step S107, the processor 121 determines whether the entering direction of the hand HD coincides with the leaving direction. In the case where the entering direction of the hand HD does not coincide with the leaving direction, since there is a fear of erroneous detection of a gesture operation, in this example, a gesture operation is not detected, and the flow is shifted to Step S113. In this regard, the case where the entering direction of the hand HD is different from the leaving direction is detected, and may be used for another control.

On the other hand, in the case where it has been determined that the entering direction of the hand HD coincides with the leaving direction, the processor 121 determines a gesture operation in the following Step S108. In concreter terms, in the case where the processor 121 determines that the gesture operations (1)+(9) have been performed continuously, in Step S109, the processor 121 controls the display unit 104 via the display control section 104DR such that a screen moves from the right to the left (page turning over or scrolling). Also, in the case where the processor 121 determines that the gesture operations (2)+(10) have been performed continuously, in Step S110, the processor 121 controls the display unit 104 via the display control section 104DR such that a screen moves from the left to the right. Furthermore, in the case where the processor 121 determines that the gesture operations (3)+(11) have been performed continuously, in Step S111, the processor 121 controls the display unit 104 via the display control section 104DR such that a screen moves from the top to the bottom. Also, in the case where the processor 121 determines that the gesture operations (4)+(12) have been performed continuously, in Step S112, the processor 121 controls the display unit 104 via the display control section 104DR such that a screen moves from the bottom to the top. The specific screen display control will be described later with reference to FIG. 19. In this way, according to the present embodiment, a direction in which a user's hand enters or leaves a detection region is determined in accordance with timing which each of a plurality of light receiving regions detects the user's hand, and then, a screen display is controlled in accordance with the determined direction. Accordingly, variations of control according to the signals of the proximity sensor can be increased.

While a user is visually recognizing through the image display section 104B a movement of hand HD that enters and leaves a space in front of an eye, the user can perform page turning over and scrolling of images in the same direction with the movement of the hand in synchronization with the recognizing, and can perform a desired operation intuitively. Accordingly, it is excellent in usability.

Furthermore, in the following Step S113, unless a signal to instruct the releasing of the first mode is input, the processor 121 returns the flow to Step S101, and continues the control. On the other hand, in the case where, in Step S113, it has been determined that a signal to instruct the releasing of the first mode is input by the user, in Step S114, the processor 121 eliminates the icon IC4, and then releases the first mode. The releasing of the first mode (that is, switching from the first mode to the second mode) may be performed by the same operation as the operation to set the first mode. Alternatively, after the second mode has been switched to the first mode, in the case where a predetermined given period of time has been elapsed from a time when the first movement has been detected lastly, the first mode may be controlled to be switched to the second mode.

Since a possibility that a gesture operation is executed continuously is high, detection of the following gesture operation is usually waited in many cases. However, in the case where non-operation time is long, such as when a user US has forgotten a stopping operation, the detection of a gesture operation may be stopped for reduction of power consumption.

In the case of electronic apparatus which takes the mode of a HMD like the present embodiment, there may be a case where a user wearing a HMD hardly notices that an object has entered a detection region, due the reasons that an object unrelated to the user has entered the detection region and that the user approaches unconsciously another object. For this reason, it can be said that the above-mentioned control of the present embodiment is effective specifically for prevention of erroneous detection.

Second Embodiment

Figure 16:
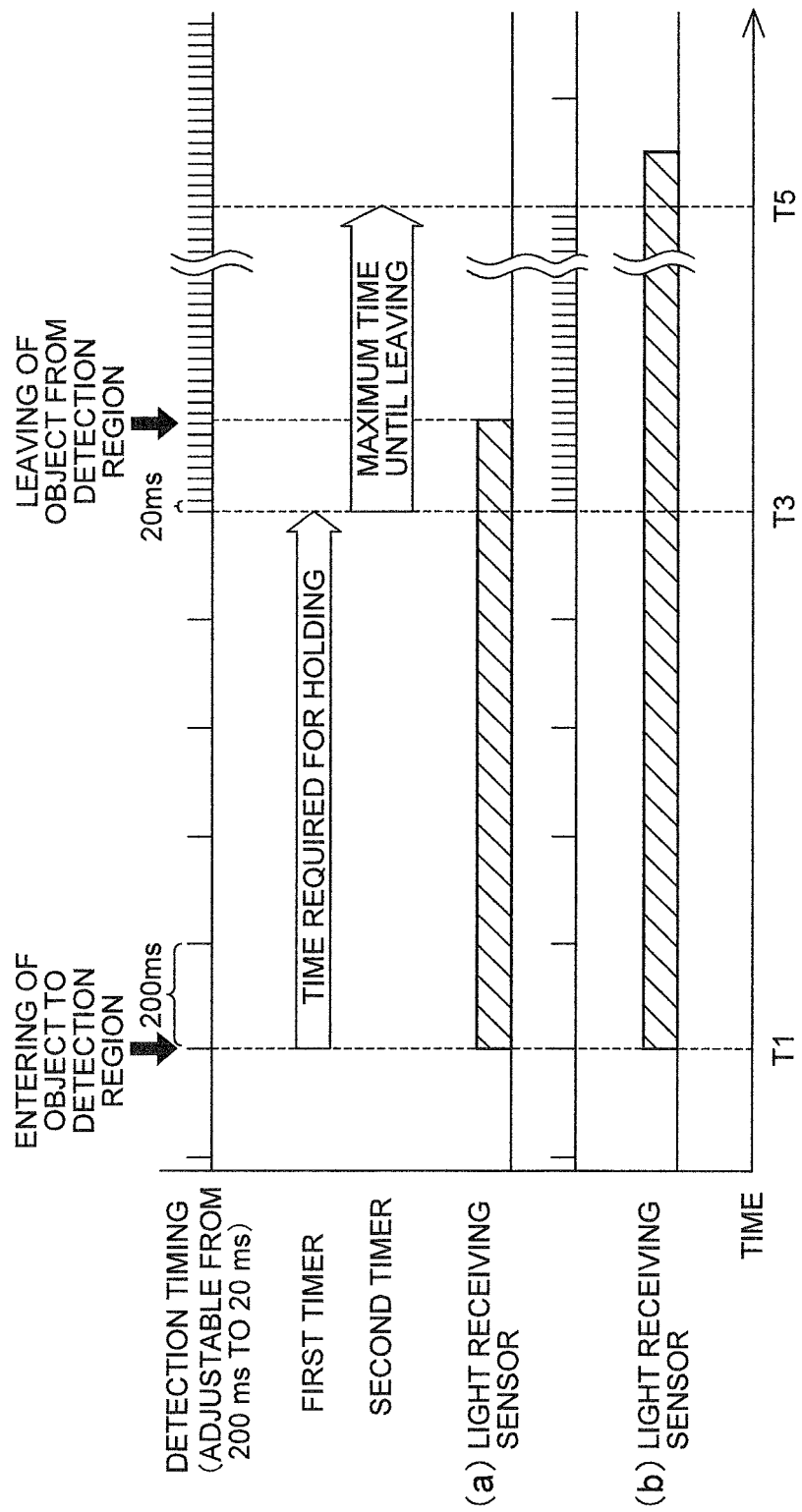
FIG. 16 is a time chart which shows detection timing according to a modified embodiment and shows an example where a gesture operation has been detected.

FIG. 16 shows a time chart of the second embodiment. In the present embodiment, as shown in FIG. 16, before setting the first mode (that is, during the setting of the second mode), the processor 121 detects the signals of the proximity sensor 105 with comparatively long 200 millisecond intervals. The constitution of the second embodiment is the same as that of the first embodiment. The interval of signal detection during the setting of the second mode is made longer than that in the first embodiment, so that the reduction of power consumption can be attained. In particular, in the case where the proximity sensor 105 is an active type, since the number of light projection times, such as infrared light rays, can be decreased, the effect of power consumption reduction becomes high. Here, the interval of output signals from the proximity sensor 105 in the second mode is made longer than that in the first mode, whereby returning to the normal state by a gesture operation can be realized while attaining the reduction of power consumption. At time T1, in the case where entering of the hand HD into a detection region is detected with the signals from the proximity sensor 105, the processor 121 actuates the first timer. However, also after that, the signals of the proximity sensor 105 are detected with 200 millisecond intervals. Even if detection of the holding of the hand HD is performed with 200 millisecond intervals, there is no problem in particular. In this way, since the switching to the first mode can also be performed by a gesture operation, there is no need to perform complicated control such as returning from the power-saving mode periodically and starting programs for gesture recognition. As a result, it is possible to prevent power consumption from becoming large unintentionally.

On the other hand, the first timer stops at time T3, and simultaneously with this, the second timer operates. Thereafter, the processor 121 narrows the interval of detection of signals of the proximity sensor 105 to 20 millisecond intervals. It is because, if a detection interval is long, the respective light receiving timings of a plurality of light receiving regions in the proximity sensor 105 may become the same so that there is a fear that the leaving direction of the hand HD may not be detected.

In the case where, after the second timer has stopped at time T5, the processor 121 has determined that the setting of the first mode should be performed, in order to enable a gesture operation to be detected precisely, the processor 121 keeps the interval to detect the signals of the proximity sensor 105 at an interval of 20 milliseconds (refer to FIG. 16). On the other hand, at time T5, after the second timer has stopped, in the case where the processor 121 has determined that the first mode setting has not be set, the processor 121 returns the interval to detect the signals of the proximity sensor 105 to 200 millisecond intervals, and waits for new detection while attaining energy saving.

Other Embodiments

Figure 17:
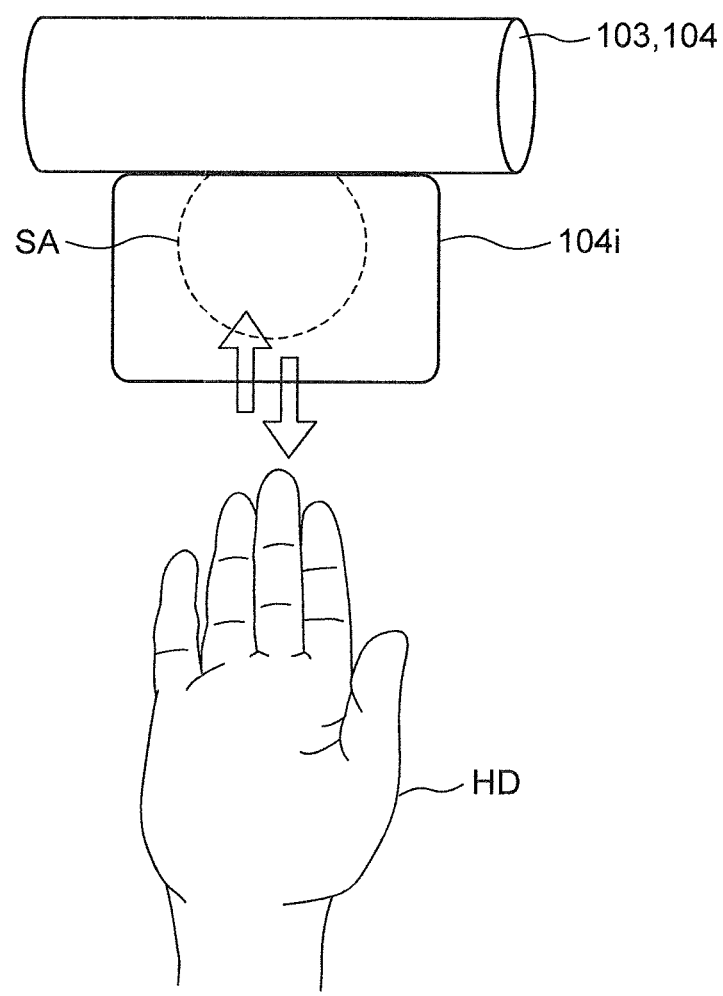
FIG. 17 is an illustration showing a movement of a hand relative to a detection region.

In each of the above embodiments, in the case where a hand having stayed at a detection region for a predetermined period of time regardless of the entering direction of the hand has left in the downward direction, it is determined that the setting of the first mode is to be performed. However, for example, as shown in FIG. 17, with the operations that makes a hand HD enter from the downward direction as the first direction, makes the hand HD stay at a detection region for a predetermined period of time, and then, makes the hand HD leave in the downward direction as the second direction, the first mode may be set. In the case where the leaving direction after the hand has stayed at a detection region for a predetermined period becomes vertical to an entering direction, this mode may be set. In this way, the entering direction and leaving direction of a hand for performing mode setting are determined beforehand, whereby a fear of erroneous detection is reduced more. The entering direction and leaving direction of a hand can be determined arbitrarily.

Moreover, in the above-mentioned first embodiment, with the second movement, switching from the second mode to skip screen display control, such as page feeding, to the first mode to execute the above-mentioned screen control is performed, and in the above-mentioned second embodiment, furthermore, returning from a low power consumption state to a normal state is also additionally performed. However, the present invention should not be restricted to these embodiments. For example, depending on the second movement, a specific image may be selected and determined from a plurality of images.

In concrete terms, as in a modified embodiment shown in FIG. 18(*a*), in the case where images G1 to G3 serving as display candidates are displayed so as to stand side by side with a small size on the screen 104*i* and the icon IC4 to show the setting of the first mode is also displayed, with a gesture operation in which a hand passes the detection region of the proximity sensor, page feeding can be performed, but an image is made so as not to be selected and displayed with an enlarged size, whereby an image is prevented from being enlarged carelessly. On the other hand, in the case where a user enters a hand from the top side as the first direction, and keeps it at the detection region for one second or more, as shown in FIG. 18(*a*), the icon IC2 is displayed. Thereafter, within less than three seconds, in the case where the hand HD is made to leave in the upward direction as the second direction, as shown in FIG. 18(*c*), the icon IC3 to show that the gesture operation has been recognized is displayed, and the processor 121 determines that the user desires selection of the image G2 positioned at the center. Then, as shown in FIG. 18(*d*), the image G2 is configured to be display with an enlarged size. Moreover, in the case where the above-mentioned gesture operation is performed during the displaying of the enlarge image, the displaying returns to the normal size.

On the other hand, in the case where the holding time or leaving time of the hand exceeds a prescribed time or is not enough for the prescribed time, as shown in FIG. 18(*e*), the icon IC5 to show that an image has not been able to be selected is displayed. In this regard, it is desired that the icon IC4 to show the first mode is made so as not to be displayed in order to avoid confusion when the other icons are displayed.

In each of the above-mentioned embodiments, regardless of the kind of an icon to be used, and in place of the icons, a situation may be informed for a user with characters, sound, or the like.

Moreover, in the above-mentioned first and second embodiments, the description has been made on the assumption that the first control performed by the first movement in the first mode is the screen display control, such as page feeding. However, the present invention should not be limited to this example, and the first control may be switching of the operational mode of electronic apparatus or adjustment of a function as described in the below. For example, as shown in FIG. 19, at the time of setting the first mode, with a gesture operation as the first movement, control may be performed so as to switch the operational mode of the HMD 100 and to make the display of a screen correspond to each operation mode. In an example shown in FIG. 19, in the transition of a screen among screens, the movement of a hand in the rightward, leftward, upward, or downward direction is recognized as a swipe operation, and the screens are made to slide and switched in synchronization with the swipe operation. Here, at the time of moving the hand HD in the upward or downward direction, it is desired to move the hand HD with a user's palm and elbow being held horizontally, or to move the hand HD vertically with a user's elbow made as a fulcrum, from the viewpoint of avoiding erroneous detection. For example, when the power of the HMD 100 is turned ON, a home screen G11 is displayed on the display unit 104. On the home screen G11, additional information, such as the present time, air temperature, and humidity, is displayed on an upper portion of the screen. Here, in the case where a gesture operation is performed so as to move the hand HD upwards from the bottom, a scree mode becomes a non-display mode which does not perform a screen display, and the display unit 104 is switched to the non-display screen G01. In this state, the user US can observe only an outside world image through the display unit 104. During this screen display (that is, during the executing of the non-display mode), in the case where a gesture operation is performed so as to move the hand HD downward from the top, the non-display mode is released, and the display unit 104 is switched to the home screen G11.

Moreover, during the displaying of the home screen G11, in the case where a gesture operation is performed so as to move the hand HD leftward from the right, the mode is shifted to a music reproduction mode, and a song title display screen G10 is displayed on the display unit 104. On the song title display screen G10, a song title being played via a speaker or an earphone, an author, etc. are displayed on an upper portion of the screen, and a volume control VOL is displayed on the left portion of the screen. In the state where the song title display screen G10 is displayed, at each time when the user US moves the hand HD upwards from the bottom, the volume of the song being reproduced increases one division by one division, conversely, at each time when the user US moves the hand HD downwards from the top, the volume of the song being reproduced decreases one division by one division, and along with this, the display changes. That is, while the image of the volume control is displayed, in the case where the hand approaches or leaves the detection region, the direction of the movement is recognized, a function (volume) made to correspond to the volume image is adjusted, and along with this, the display is renewed. During this screen display, in the case where a gesture operation is performed so as to move the hand HD rightward from the left, the display unit 104 is switched to the home screen G11.

Furthermore, during the displaying of the home screen G11, in the case where a gesture operation is performed so as to move the hand HD rightward from the left, the mode is shifted to an imaging mode, and an imaging field angle display screen G12 is displayed on the display unit 104. The user US understands that a photographic object within a rectangle frame displayed on the imaging field angle display screen G12 can be imaged as a still image or an animation with the camera 106. The imaging may be started or finished in synchronization with the switching of the screen, the imaging may be started or finished after a waiting time has elapsed from the time of the switching of the screen, or the imaging may be started or finished with the detection of the movement of a hand determined as mentioned above, the operation of the operating section, or sounds. During the displaying of this screen, in the case where a gesture operation is performed so as to move the hand HD leftward from the right, the display unit 104 is switched to the home screen G11.

Furthermore, during the displaying of the home screen G11, in the case where a gesture operation is performed so as to move the hand HD downward from the top, the mode is shifted to a setting mode, and a setting display screen G21 is displayed on the display unit 104. During the displaying of the setting display screen G21, in the case where a gesture operation is performed so as to move the hand HD leftward from the right, the display unit 104 is switched to another setting display screen G20, alternatively, in the case where a gesture operation is performed so as to move the hand HD rightward from the left, the display unit 104 is switched to another setting display screen G22, and the respective another settings can be performed by using, for example, the operating section 122. During the displaying of the setting display screen G21, in the case where a gesture operation is performed so as to move the hand HD leftward from the right, the display unit 104 is switched to the home screen G11. In this connection, during the displaying of a list display screen (a menu screen) including a plurality of selection items, movement in a longitudinal direction or a transverse direction to select a candidate item may be performed by using the detection of a gesture operation.

It should be noted that the display contents of each of the above screens is only an example, and an arbitrary display content may be added or replaced from various screens including images related to other functions. Moreover, it is possible to set appropriately in accordance with a user's preference the following matters, such as what screen to be switched to in response to the moving direction of a hand, or how to set an animation at the time of switching.

Furthermore, in the present embodiment, the pyroelectric sensor which is a kind of a passive type sensor is used as a proximity sensor. However, in place of this, it may be possible to use an active type sensor that includes a light emitting section to emit invisible light rays, such as infrared light rays, and a light receiving section to detect invisible light rays emitted from the light emitting section and reflected by an object. In the case where an active type sensor is used, even in the case where a user wears a glove which does not transmit detection light rays, such as infrared light rays, there is a merit that a gesture operation can be detected. Furthermore, the present invention should not be limited to the HMD, and is applicable to a mobile terminal, such as a smart phone.

Furthermore, in the above-mentioned first and second embodiments, in the case where, regardless of an entering direction into a detection region, a leaving direction is a specific direction (a downward direction) and a staying time at the detection region is a predetermined time (one to three seconds), it is determined that the movement is the second movement. Moreover, in the modified embodiment in FIG. 17, in the case where an entering direction into a detection region is a specific direction (an upward direction), a leaving direction is the other specific direction (a downward direction), and a staying time at the detection region is a predetermined time, it is determined that the movement is the second movement. However, the present invention should not be limited to these examples, and various combinations are possible depending on a combination of a staying time at a detection region, the first direction, and the second direction. In this case, an operation determined to leave in a direction reverse to an entering direction, or to leave in a direction orthogonal to an entering direction, enables a user to memorize operation contents easily and to hardly cause an erroneous operation.

Moreover, examples of the first control should not be limited to the above-mentioned screen display control, the switching of the operational mode of an electronic apparatus, and the adjustment of functions, and include a control to select an application and to actuate the application, and a control to select a menu and then, to execute an operation specified with the selected menu.

A manner to perform setting the first mode and releasing the first mode (setting the second mode) based on the output from the above-mentioned proximity sensor and a manner to perform them with the other means (for example, the operation section 122) may be made to be switched to or from each other.

It is clear for a person skilled in the art from the embodiments written in the present specification and technical concepts that the present invention should not be limited to the embodiments and modified embodiments written in the present specification, and includes other embodiments and modification embodiments. The descriptions and the embodiments of the present specification are aimed to show exemplification only, and the scope of the present invention is shown with claims mentioned later.

REFERENCE SIGNS LIST

100 HMD
101 Frame
101*a* Anterior portion
101*b* Side portion
101*c* Side portion
101*d* Long hole
101*e* Long hole
102 Eye-glass Lens
103 Main body Section
104 Display
104A Image forming section
104B Image display section
104DR Display control section
104*a* Light source
104*b* One-direction diffusion plate
104*c* Condenser lens
104*d* Display element
104*f* Eyepiece prism
104*g* Deflection prism
104*h* Hologram optical element
104*i* Screen
105 Proximity Sensor
105*a* Light receiving section
106 Camera
106*a* Lens
107 Right sub-main body section
107*a* Protrusion
108 Left sub-main body section
108*a* Protrusion
109 Acceleration sensor
110 Gyro
111A Speaker (or earphone)
111B Microphone
121 Processor
122 Operating section
123 GPS receiving section
124 Communication section
125 ROM
126 RAM
127 Battery
129 Storage device
200 Smart phone
CD Coad
CTU Control unit
HD Hand
HS Wiring
IC1 to IC5 Icon
PL1 Base end surface
PL2 Internal surface
PL3 External surface
PL4 Inclined surface
PL4, PL5 Inclined surface
RA to RD Light receiving region
SA Detection region
EV Effective view field
US User

The invention claimed is:

1. An electronic apparatus, comprising:
a proximity sensor to detect an object on a detection region within a proximity range and to create an output;
at least one device controlled based on a control signal; and
a control circuit to create a control signal to control the at least one device,
wherein the control circuit is able to execute a first mode which executes a first control with respect to the at least one device or the control circuit itself in response to an output of the proximity sensor corresponding to a first movement of the object relative to the proximity sensor and a second mode that skips the first control for an output of the proximity sensor corresponding to the first movement,
wherein the control circuit switches from the second mode to the first mode or from the first mode to the second mode based on an output of the proximity sensor corresponding to a second movement of the object, different from the first movement, relative to the proximity sensor,
wherein the second movement is a movement in which the object stays at the detection region for a first time, and thereafter, leaves the detection region from there within a second time, and
wherein the proximity sensor detects a direction in which the object enters the detection region and a direction in which the object leaves the detection region, and, when the control circuit determines based on an output of the proximity sensor such that at least a part of the object has entered the detection region from a first direction, has stayed for the first time or more, and then, has left the detection region in a second direction within the second time, the control circuit switches from the second mode to the first mode.

2. The electronic apparatus described in claim 1, wherein the control circuit switches from the second mode to the first mode based on an output of the proximity sensor corresponding to the second movement of the object.

3. The electronic apparatus described in claim 2, wherein after the second mode has been switched to the first mode, when a predetermined time has elapsed since the first movement has been detected lastly, the control circuit switches from the first mode to the second mode.

4. The electronic apparatus described in claim 1, wherein the proximity sensor detects a direction in which the object enters the detection region and a direction in which the object leaves the detection region, and, the control circuit executes a first control with respect to the at least one device or the control circuit itself in the first mode based on a combination of the first direction in which at least a part of the object enters the detection region and the second direction in which the object leaves the detection region.

5. The electronic apparatus described in claim 1, wherein the proximity sensor creates an output corresponding to a distance between the object and the proximity sensor within the detection region, and when the control circuit determines based on the output of the proximity sensor such that the object gradually approaches the proximity sensor within the detection region, the control circuit skips the switching from the first mode to the second mode or the switching from the second mode to the first mode.

6. The electronic apparatus described in claim 1, wherein as the device, there is provided a display unit including a display member equipped with a screen capable of displaying an image, and the control circuit executes a control specified with respect to screen display of the display unit in the first control in the first mode, and skips a control specified with respect to the screen display of the display unit in the second mode.

7. The electronic apparatus described in claim 6, wherein when the control circuit determines based on an output of the proximity sensor that at least a part of the object has stayed at the detection region for the first time or more, the control circuit makes the display unit perform a first display on a screen thereof, and thereafter, when the control circuit determines that the at least a part of the object has left from the detection region within the second time, the control circuit makes the display unit perform a second display different from the first display on the screen thereof.

8. The electronic apparatus described in claim 6, further comprising a wearing member to hold the display unit so as to place the display member in front of at least one of user's eyes.

9. The electronic apparatus described in claim 8, wherein the display member of the display unit is a see-through type.

10. The electronic apparatus described in claim 1, wherein the proximity sensor includes a light receiving section to detect invisible light rays emitted from or reflected on an object.

11. The electronic apparatus described in claim 1, wherein the control circuit receives an instruction from a user, and is able to adjust at least one of the first time and the second time based on the instruction.

12. The electronic apparatus described in claim 1, wherein a movement of a users hand, or finger or an instruction tool moved based on an intention of a user is detected, and a control with respect to the at least one device or the control circuit is performed.

13. A method of controlling an electronic apparatus equipped with a proximity sensor to detect an object on a detection region within a proximity range and to create an output, and at least one device controlled based on a control signal, comprising:
being able to set by switching a first mode that executes a first control with respect to the at least one device or a control circuit itself in response to an output of the proximity sensor corresponding to a first movement of the object relative to the proximity sensor and a second mode that skips the first control for an output of the proximity sensor corresponding to the first movement; and
switching from the second mode to the first mode or from the first mode to the second mode base on an output of the proximity sensor corresponding to a second movement of the object, different from the first movement, relative to the proximity sensor,
wherein the second movement is a movement in which the object stays at the detection region for a first time, and thereafter, leaves the detection region within a second time from there, and
wherein the proximity sensor detects a direction in which the object enters the detection region and a direction in which the object leaves the detection region, and, when the control circuit determines based on an output of the proximity sensor such that at least a part of the object has entered the detection region from a first direction, has stayed for the first time or more, and then, has left the detection region in a second direction within the second time, the control circuit switches from the second mode to the first mode.

14. A non-transitory control program for an electronic apparatus equipped with a proximity sensor to detect an object on a detection region within a proximity range and to create an output, at least one device controlled based on a control signal, and a control circuit to create a control signal to control the device based on an output of the proximity sensor, comprising:
controlling based on the control program the control circuit so as to be able to execute a first mode that executes a first control with respect to the at least one device or the control circuit itself in response to an output of the proximity sensor corresponding to a first movement of the object relative to the proximity sensor and a second mode that skips the first control for an output of the proximity sensor corresponding to the first movement; and
switching from the second mode to the first mode or from the first mode to the second mode based on an output of the proximity sensor corresponding to a second movement of the object, different from the first movement, relative to the proximity sensor,
wherein the second movement is a movement in which the object stays at the detection region for a first time, and thereafter, leaves the detection region within a second time from there, and
wherein the proximity sensor detects a direction in which the object enters the detection region and a direction in which the object leaves the detection region, and, when the control circuit determines based on an output of the proximity sensor such that at least a part of the object has entered the detection region from a first direction, has stayed for the first time or more, and then, has left the detection region in a second direction within the second time, the control circuit switches from the second mode to the first mode.

* * * * *